(12) United States Patent
Do et al.

(10) Patent No.: US 11,208,503 B2
(45) Date of Patent: Dec. 28, 2021

(54) GERMANIUM-BRIDGED BIS-BIPHENYL-PHENOXY CATALYSTS FOR OLEFIN POLYMERIZATION

(71) Applicant: Dow Global Technologies LLC, Midland, MI (US)

(72) Inventors: Hien Q. Do, Sugar Land, TX (US); Philip P. Fontaine, Pearland, TX (US); Andrew J. Young, Houston, TX (US); Susan G. Brown, Pearland, TX (US); Johnathan E. DeLorbe, Manvel, TX (US); Tulaza Vaidya, Royersford, PA (US); Chunming Zhang, Zionsville, IN (US); Jerzy Klosin, Midland, MI (US); Ruth Figueroa, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 111 days.

(21) Appl. No.: 16/497,542

(22) PCT Filed: Mar. 21, 2018

(86) PCT No.: PCT/US2018/023521
§ 371 (c)(1),
(2) Date: Sep. 25, 2019

(87) PCT Pub. No.: WO2018/183056
PCT Pub. Date: Oct. 4, 2018

(65) Prior Publication Data
US 2020/0109220 A1    Apr. 9, 2020

Related U.S. Application Data

(60) Provisional application No. 62/479,892, filed on Mar. 31, 2017.

(51) Int. Cl.
| | | |
|---|---|---|
| *C08F 4/64* | (2006.01) | |
| *C08F 4/76* | (2006.01) | |
| *C08F 210/16* | (2006.01) | |

(52) U.S. Cl.
CPC ........ *C08F 4/64193* (2013.01); *C08F 210/16* (2013.01); *C08F 2500/12* (2013.01)

(58) Field of Classification Search
CPC ....... C08F 4/64193; C08F 4/64; C08F 210/16
See application file for complete search history.

(56) References Cited

U.S. PATENT DOCUMENTS

| | | | | |
|---|---|---|---|---|
| 8,609,794 B2 * | 12/2013 | Klosin | ................ | C08F 4/64193 |
| | | | | 526/172 |
| 9,527,940 B2 * | 12/2016 | Demirors | .............. | C08F 210/16 |
| 9,527,941 B2 * | 12/2016 | Demirors | .............. | C08F 210/16 |
| 9,605,098 B2 | 3/2017 | Klosin et al. | | |
| 9,751,998 B2 * | 9/2017 | Klosin | ................ | C08F 4/64186 |
| 10,214,602 B2 | 2/2019 | Demirors et al. | | |
| 10,301,412 B2 * | 5/2019 | Klosin | .................. | C08F 210/16 |
| 10,351,646 B2 * | 7/2019 | Fontaine | ............... | C08F 210/16 |
| 10,597,473 B2 * | 3/2020 | Figueroa | ............... | C08F 210/16 |
| 10,870,713 B2 * | 12/2020 | Figueroa | ................ | B01J 31/223 |
| 2011/0282018 A1 | 11/2011 | Klosin et al. | | |
| 2014/0163186 A1 | 6/2014 | Klosin et al. | | |
| 2015/0337062 A1 * | 11/2015 | Demirors | .............. | C08F 210/16 |
| | | | | 526/132 |
| 2015/0344601 A1 * | 12/2015 | Demirors | .............. | C08F 210/16 |
| | | | | 526/348.2 |
| 2017/0101493 A1 | 4/2017 | Fontaine et al. | | |
| 2017/0101494 A1 | 4/2017 | Fontaine et al. | | |
| 2018/0194871 A1 | 7/2018 | Figueroa et al. | | |
| 2018/0265604 A1 | 9/2018 | Figueroa et al. | | |
| 2018/0282452 A1 | 10/2018 | Fontaine et al. | | |

FOREIGN PATENT DOCUMENTS

| | | | |
|---|---|---|---|
| EP | 2473538 B1 | 7/2017 | |
| WO | 2011146044 A1 | 11/2011 | |
| WO | 2014105411 A1 | 7/2014 | |
| WO | 2014105413 A1 | 7/2014 | |
| WO | 2016003878 A1 | 1/2016 | |
| WO | 2016089935 A1 | 6/2016 | |
| WO | WO 2016/089935 A1 * | 6/2016 | ................ C07F 7/00 |

OTHER PUBLICATIONS

International Search Report and Written Opinion pertaining to PCT/US2018/023521 dated Jul. 13, 2018.
International Search Report and Written Opinion pertaining to PCT/US2018/025176 dated Jul. 23, 2018. (80216).

\* cited by examiner

*Primary Examiner* — Rip A Lee
(74) *Attorney, Agent, or Firm* — Dinsmore & Shohl LLP

(57) ABSTRACT

Embodiments are directed to a catalyst system comprising metal ligand complexes and processes for polyolefin polymerization using the metal ligand complex having the following structure: Formula I.

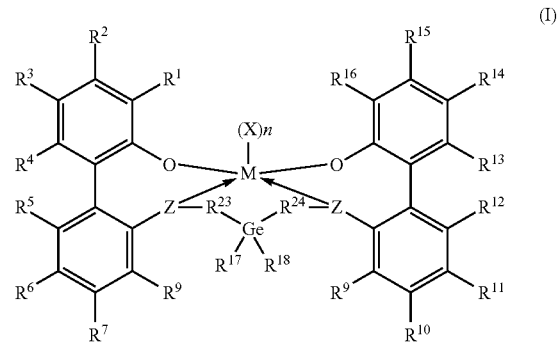

20 Claims, No Drawings

GERMANIUM-BRIDGED BIS-BIPHENYL-PHENOXY CATALYSTS FOR OLEFIN POLYMERIZATION

CROSS REFERENCE TO RELATED APPLICATIONS

This application claims priority to U.S. Provisional Patent Application Ser. No. 62/479,892 filed Mar. 31, 2017, which is incorporated by reference herein in its entirety.

TECHNICAL FIELD

Embodiments of the present disclosure generally relate to olefin polymerization catalyst systems and processes and, more specifically to germanium-bridged bis-biphenyl-phenoxy catalyst systems for olefin polymerization and to olefin polymerization processes incorporating the catalyst systems.

BACKGROUND

Olefin based polymers such as polyethylene and/or polypropylene are produced via various catalyst systems. Selection of such catalyst systems used in the polymerization process of the olefin based polymers is an important factor contributing to the characteristics and properties of such olefin based polymers.

Polyethylene and polypropylene are manufactured for a wide variety of articles. The polyethylene and polypropylene polymerization process can be varied in a number of respects to produce a wide variety of resultant polyethylene resins having different physical properties that render the various resins suitable for use in different applications. The ethylene monomers and optionally one or more co-monomers are present in liquid diluents, such as an alkane or isoalkane, for example isobutane. Hydrogen may also be added to the reactor. The catalyst systems for producing polyethylene may typically comprise a chromium-based catalyst system, a Ziegler-Natta catalyst system, and a molecular (either metallocene or non-metallocene) catalyst system. The reactants in the diluent and the catalyst system are circulated at an elevated polymerization temperature around the reactor, thereby producing polyethylene homopolymer or copolymer. Either periodically or continuously, part of the reaction mixture, including the polyethylene product dissolved in the diluent, together with unreacted ethylene and one or more optional co-monomers, is removed from the reactor. The reaction mixture when removed from the reactor may be processed to remove the polyethylene product from the diluent and the unreacted reactants, with the diluent and unreacted reactants typically being recycled back into the reactor. Alternatively, the reaction mixture may be sent to a second reactor serially connected to the first reactor where a second polyethylene fraction may be produced. Despite the research efforts in developing catalyst systems suitable for olefin polymerization, such as polyethylene or polypropylene polymerization, there is still a need to increase the efficiencies of catalyst systems that are capable of producing polymer with high molecular weights and a narrow molecular weight distribution.

SUMMARY

According to some embodiments, a procatalyst system includes a metal-ligand complex according to formula (I):

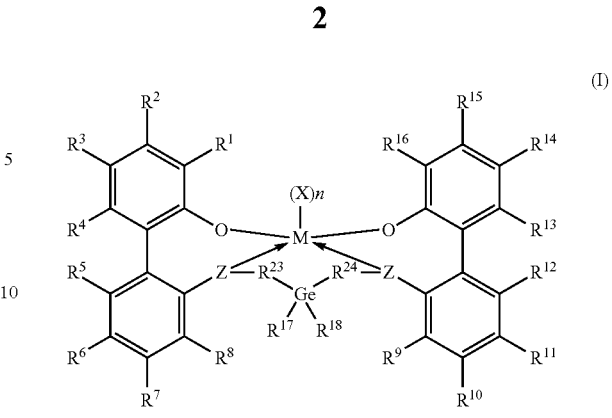

In formula (I), M is a metal chosen from titanium, zirconium, or hafnium, the metal being in a formal oxidation state of +2, +3, or +4; n is 0, 1, or 2; when n is 1, X is a monodentate ligand or a bidentate ligand; when n is 2, each X is a monodentate ligand and is the same or different; the metal-ligand complex is overall charge-neutral; each Z is independently chosen from —O—, —S—, —N($R^N$)—, or —P($R^P$)—; $R^1$ and $R^{16}$ are independently selected from the group consisting of —H, ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen, and radicals having formula (II), formula (III), or formula (IV):

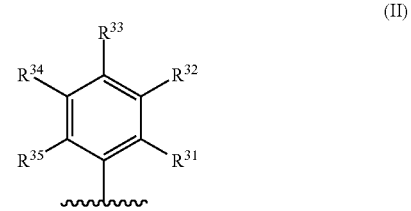

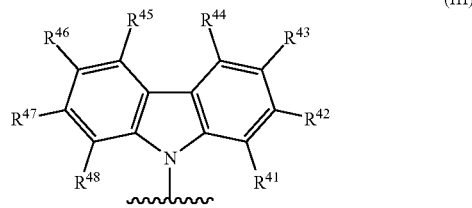

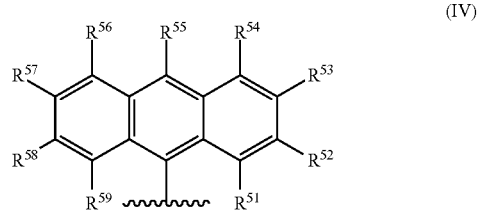

In formulas (II), (III), and (IV), each of $R^{31-35}$, $R^{41-48}$, or $R^{51-59}$ is independently chosen from ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —N=CHR$^C$, —OR$^C$, —SR$^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen, or —H, provided at least one of $R^1$ or $R^{16}$ is a radical having formula (II), formula (III), or formula (IV).

In formula (I), each of $R^{2-4}$, $R^{5-8}$, $R^{9-12}$, and $R^{13-15}$ is independently selected from ($C_1$-$C_{40}$)hydrocarbyl, ($C_1$-$C_{40}$)

heterohydrocarbyl, —Si(R$^C$)$_3$, —Ge(R$^C$)$_3$, —P(R)$_2$, —N(R$^N$)$_2$, —N=CHR$^C$, —OR$^C$, —SR$^C$, —NO$_2$, —CN, —CF$_3$, R$^C$S(O)—, R$^C$S(O)$_2$—, (R$^C$)$_2$C=N—, R$^C$C(O)O—, R$^C$OC(O)—, R$^C$C(O)N(R$^N$)—, (R$^N$)$_2$NC(O)—, halogen, and —H; R$^{17}$ and R$^{18}$ are independently (C$_2$-C$_{40}$)hydrocarbyl, provided that when both R$^{17}$ and R$^{18}$ are ethyl, not more than two of R$^{5-7}$ are fluorine or not more than two R$^{10-12}$ are fluorine; R$^{23}$ and R$^{24}$ are independently selected from —(CR$^C_2$)$_m$—, where m is 1 or 2; each R$^C$, R$^P$, and R$^N$ in formula (I) is independently a (C$_1$-C$_{30}$)hydrocarbyl, (C$_1$-C$_{30}$)heterohydrocarbyl, or —H.

DETAILED DESCRIPTION

Specific embodiments of catalyst systems will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

Common Abbreviations are Listed Below:
R, Z, M, X and n: as defined above; Me: methyl; Et: ethyl; Ph: phenyl; Bn: benzyl; i-Pr: iso-propyl; t-Bu: tert-butyl; t-Oct: tert-octyl (2,4,4-trimethylpent-2-yl); n-Oct: n-octyl; Ts: toluene sulfonate; THF: tetrahydrofuran; Et$_2$O: diethyl ether; MeOH: methanol; DMA: dimethylacetamide; DME: dimethoxyethane; CH$_2$Cl$_2$ or DCM: dichloromethane; CCl$_4$: carbon tetrachloride; EtOH: ethanol; CH$_3$CN: acetonitrile; EtOAc: ethyl acetate; C$_6$D$_6$: deuterated benzene or benzene-d6; CDCl$_3$: deuterated chloroform; DMSO-d6: deuterated dimethylsulfoxide; DBA: dibenzylideneacetone; PPh$_3$: triphenylphosphine; tBu$_3$P: tri-t-butylphosphine; tBu$_3$P Pd G2:

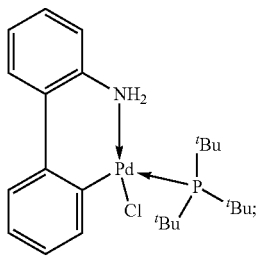

SiO$_2$: silica gel; Me$_4$Si: tetramethylsilane; NaOH: sodium hydroxide; HCl: hydrochloric acid; NaHCO$_3$: sodium bicarbonate; NaOtBu: sodium tert-butoxide; K$_3$PO$_4$: potassium phosphate tribasic; brine: saturated aqueous sodium chloride; Na$_2$SO$_4$: sodium sulfate; MgSO$_4$: magnesium sulfate; n-BuLi: n-butyllithium; CuI: copper(I) iodide; Cs$_2$CO$_3$: cesium carbonate; HfCl$_4$: hafnium(IV) chloride; HfBn$_4$: hafnium(IV) tetrabenzyl; ZrCl$_4$: zirconium(IV) chloride; ZrBn$_4$: zirconium(IV) tetrabenzyl; N$_2$: nitrogen gas; PhMe: toluene; MAO: methylaluminoxane; MMAO: modified methylaluminoxane; PTFE: polytetrafluoroethylene; GC: gas chromatography; LC: liquid chromatography; NMR: nuclear magnetic resonance; HRMS: high resolution mass spectrometry; mmol: millimoles; mL: milliliters; M: molar; min minutes; h: hours; d: days; equiv: equivalents.

The term "independently selected" is used herein to indicate that the R groups, such as, R$^1$, R$^2$, R$^3$, R$^4$, and R$^5$ can be identical or different (e.g., R$^1$, R$^2$, R$^3$, R$^4$, and R$^5$ may all be substituted alkyls or R$^1$ and R$^2$ may be a substituted alkyl and R$^3$ may be an aryl, etc.). Use of the singular includes use of the plural and vice versa (e.g., a hexane solvent, includes hexanes). A named R group will generally have the structure that is recognized in the art as corresponding to R groups having that name. These definitions are intended to supplement and illustrate, not preclude, the definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "cocatalyst" and "activator" are interchangeable terms.

When used to describe certain carbon atom-containing chemical groups, a parenthetical expression having the form "(C$_x$-C$_y$)" means that the unsubstituted form of the chemical group has from x carbon atoms to y carbon atoms, inclusive of x and y. For example, a (C$_1$-C$_{50}$)alkyl is an alkyl group having from 1 to 50 carbon atoms in its unsubstituted form. In some embodiments and general structures, certain chemical groups may be substituted by one or more substituents such as R$^S$. An R$^S$ substituted version of a chemical group defined using the "(C$_x$-C$_y$)" parenthetical may contain more than y carbon atoms depending on the identity of any groups R$^S$. For example, a "(C$_1$-C$_{50}$)alkyl substituted with exactly one group R$^S$, where R$^S$ is phenyl (—C$_6$H$_5$)" may contain from 7 to 56 carbon atoms. Thus, in general when a chemical group defined using the "(C$_x$-C$_y$)" parenthetical is substituted by one or more carbon atom-containing substituents R$^S$, the minimum and maximum total number of carbon atoms of the chemical group is determined by adding to both x and y the combined sum of the number of carbon atoms from all of the carbon atom-containing substituents R$^S$.

In some embodiments, each of the chemical groups (e.g., X, R, Z, etc.) of the metal-ligand complex of formula (I) may be unsubstituted, that is, can be defined without use of a substituent R$^S$, provided the above-mentioned conditions are satisfied. In other embodiments, at least one of the chemical groups of the metal ligand complex of formula (I) independently contain one or more of the substituents R$^S$. In most embodiments, there are not more than a total of 20 R$^S$, and in other embodiments, not more than a total of 10 R$^S$, and in some embodiments, not more than a total of 5 R$^S$ in the metal ligand complex of formula (I). Where the compound contains two or more substituents R$^S$, each R$^S$ independently is bonded to a same or different substituted chemical group. When two or more R$^S$ are bonded to a same chemical group, they independently are bonded to a same car different carbon atom or heteroatom in the same chemical group up to and including persubstitution of the chemical group.

The term "persubstitution" means each hydrogen atom (H) bonded to a carbon atom or heteroatom of a corresponding unsubstituted compound or functional group is replaced by a substituent (e.g., R$^S$). The term "polysubstitution" means each of at least two, but not all, hydrogen atoms bonded to carbon atoms or heteroatoms of a corresponding unsubstituted compound or functional group are replaced by a substituent.

The term "—H" means a hydrogen or hydrogen radical that is covalently bonded to another atom. "Hydrogen" and "—H" are interchangeable, and unless clearly specified mean the same thing.

The term "(C$_1$-C$_{40}$)hydrocarbyl" means a hydrocarbon of from 1 to 40 carbon atoms and the term "(C$_1$-C$_{40}$)hydrocarbylene" means a hydrocarbon diradical of from 1 to 40 carbon atoms, in which each hydrocarbon radical and each hydrocarbon diradical is aromatic or non-aromatic, saturated or unsaturated, straight chain or branched chain, cyclic (including mono- and poly-cyclic, fused and non-fused polycyclic, including bicyclic; 3 carbon atoms or more) or acyclic, and each hydrocarbon is unsubstituted or substituted by one or more $R^S$.

In this disclosure, a $(C_1-C_{40})$hydrocarbyl may be an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. Each of the aforementioned $(C_1-C_{40})$hydrocarbyl groups has a maximum of 20 carbon atoms (i.e., $(C_1-C_{20})$hydrocarbyl).

The terms "$(C_1-C_{40})$alkyl" and "$(C_1-C_{18})$alkyl" mean a saturated straight or branched hydrocarbon radical of from 1 to 40 carbon atoms or from 1 to 18 carbon atoms, respectively, that is unsubstituted or substituted by one or more $R^S$. Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $C_1-C_{10})$alkyl, trifluoromethyl, and $[C_{45}]$alkyl. The term "$[C_{45}]$alkyl" (with square brackets) means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl independently is methyl, trifluoromethyl, ethyl, 1-propyl, 2-propyl (also called 1-methylethyl and iso-propyl), or 1,1-dimethylethyl (also called tert-butyl).

The term "$(C_6-C_{40})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic; ring carbon atoms, and the mono-, bi- or tricyclic radical comprises 1, 2 or 3 rings, respectively; wherein the 1 ring is aromatic and the 2 or 3 rings independently are fused or non-fused and at least one of the 2 or 3 rings is aromatic. Examples of unsubstituted $(C_6-C_{40})$aryl are $(C_6-C_{20})$aryl unsubstituted $(C_6-C_{18})$aryl; 2-$(C_1-C_5)$alkyl-phenyl; 2,4-bis$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl are substituted $(C_1-C_{20})$aryl; substituted $(C_6-C_{18})$aryl; 2,4-bis[$(C_{20})$alkyl]-phenyl; polyfluorophenyl; pentafluorophenyl; and fluoren-9-one-1-yl.

The term "$(C_3-C_{40})$cycloalkyl" means a saturated cyclic hydrocarbon radical of from 3 to 40 carbon atoms that is unsubstituted or substituted by one or more $R^S$. Other cycloalkyl groups (e.g., $(C_3-C_{12})$alkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{40})$hydrocarbylene include unsubstituted or substituted $(C_6-C_{40})$arylene, $(C_3-C_{40})$cycloalkylene, and $(C_1-C_{40})$alkylene (e.g., $(C_1-C_{20})$alkylene). In some embodiments, the diradicals are on the same carbon atom (e.g., —$CH_2$—) or on adjacent carbon atoms (i.e., 1,2-diradicals), or are spaced apart by one, two, or more than two intervening carbon atoms e.g., respective 1,3-diradicals, 1,4-diradicals. Some diradicals include α,ω-diradical. The α,ω-diradical is a diradical that has maximum carbon backbone spacing between the radical carbons. Some examples of $(C_2-C_{20})$alkylene α,ω-diradicals include ethan-1,2-diyl (i.e. —$CH_2CH_2$—), propan-1,3-diyl (i.e. —$CH_2CH_2CH_2$—), 2-methylpropan-3-diyl (i.e. —$CH_2CH(CH_3)CH_2$—). Some examples of $(C_6-C_{50})$arylene α,ω-diradicals include phenyl-1,4-diyl, napthalen-2,6-diyl, or napthalen-3,7-diyl.

The term "$(C_1-C_{40})$alkylene" means a saturated straight chain or branched chain diradical (i.e., the radicals are not on ring atoms) of from 1 to 40 carbon atoms that is unsubstituted or substituted by one or more $R^S$. Examples of unsubstituted $(C_1-C_{50})$alkylene are unsubstituted $(C_1-C_{20})$alkylene, including unsubstituted —$CH_2CH_2$—, —$(CH_2)_3$—, —$(CH_2)_4$—, —$(CH_2)_5$—, —$(CH_2)_6$—, —$(CH_2)_7$—, —$(CH_2)_8$—, —$CH_2C^*HCH_3$, and —$(CH_2)_4C^*(H)(CH_3)$, in which "$C^*$" denotes a carbon atom from which a hydrogen atom is removed to form a secondary or tertiary alkyl radical. Examples of substituted $(C_1-C_{50})$alkylene are substituted $(C_1-C_{20})$alkylene, —$CF_2$—, —$C(O)$—, and —$(CH_2)_{14}C(CH_3)_2(CH_2)_5$— (i.e., a 6,6-dimethyl substituted normal-1,20-eicosylene). Since as mentioned previously two $R^S$ may be taken together to form a $(C_1-C_{18})$alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis(methylene)bicyclo[2.2.2]octane.

The term "$(C_3-C_{40})$cycloalkylene" means a cyclic diradical radicals are on ring atoms) of from 3 to 40 carbon atoms that is unsubstituted or substituted by one or more $R^S$.

The term "heteroatom," refers to an atom other than hydrogen or carbon. Examples of heteroatoms include O, S, S(O), $S(O)_2$, $Si(R^C)_3$, $P(R^P)$, $N(R^N)$, —N=$C(R^C)_2$, —Ge$(R^C)_2$—, or —$Si(R^C)_2$—, where each $R^C$ and each $R^P$ is unsubstituted $(C_1-C_{18})$hydrocarbyl or —H, and where each $R^N$ is unsubstituted $(C_1-C_{18})$hydrocarbyl. The term "heterohydrocarbon" refers to a molecule or molecular framework in which one or more carbon atoms are replaced with a heteroatom. The term "$(C_1-C_{50})$heterohydrocarbyl" means a heterohydrocarbon radical of from 1 to 50 carbon atoms, and the term "$(C_1-C_{50})$heterohydrocarbylene" means a heterohydrocarbon diradical of from 1 to 50 carbon atoms. The heterohydrocarbon of the $(C_1-C_{50})$heterohydrocarbyl or the $(C_1-C_{50})$heterohydrocarbylene has one or more heteroatoms. The radical of the heterohydrocarbyl is on a carbon atom or a heteroatom, and diradicals of the heterohydrocarbyl may be on: (1) one or two carbon atom, (2) one or two heteroatoms, or (3) a carbon atom and a heteroatom. Each $(C_1-C_{50})$heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

In some embodiments, the $(C_1-C_{40})$heterohydrocarbyl independently is unsubstituted or substituted $(C_1-C_{40})$heteroalkyl, $(C_1-C_{40})$hydrocarbyl-O—, $(C_1-C_{40})$hydrocarbyl-S—, $(C_1-C_{40})$hydrocarbyl-S(O)—, $(C_1-C_{40})$hydrocarbyl-S$(O)_2$—, $(C_1-C_{40})$hydrocarbyl-Si$(R^C)_2$, $(C_1-C_{40})$hydrocarbyl-N$(R^N)$, $(C_1-C_{40})$hydrocarbyl-P$(R^P)$—, $(C_2-C_{40})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{40})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

The term "heteroaromatic hydrocarbon" means an aromatic hydrocarbon molecule or molecular framework in which one to four carbon atoms are replaced with heteroatoms. The term "(C₄-C₅₀)heteroaryl" means an unsubstituted or substituted (by one or more $R^S$) mono-, bi- or tricyclic heteroaromatic hydrocarbon radical of from 4 to 50 total carbon atoms, and the mono-, bi- or tricyclic radical comprises 1, 2 or 3 rings, respectively, wherein the 2 or 3 rings independently are fused or non-fused and at least one of the 2 or 3 rings is heteroaromatic. Other heteroaryl groups (e.g., $(C_x\text{-}C_y)$heteroaryl generally, such as $(C_4\text{-}C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered or 6-membered ring. The 5-membered ring has from 1 to 4 carbon atoms and from 4 to 1 heteroatoms, each heteroatom being O, S, N, or P. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 4 or 5 carbon atoms and 2 or 1 heteroatoms, the heteroatoms being N or P. Examples of 6-membered ring heteroaromatic hydrocarbon radical are pyridine-2-yl; pyrimidin-2-yl; and pyrazin-2-yl. The bicyclic heteroaromatic hydrocarbon radical can be a fused 5,6-or 6,6-ring system. Examples of the fused 5,6-ring system bicyclic, heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,6,6-ring system is acrydin-9-yl.

The aforementioned heteroalkyl may be saturated straight or branched chain radicals containing $(C_1\text{-}C_{50})$ carbon atoms, or fewer carbon atoms and one or more of the heteroatoms. Likewise, the heteroalkylene may be saturated straight or branched chain diradicals containing from 1 to 50 carbon atoms and one or more than one heteroatoms. The heteroatoms, as defined above, may include $Si(R^C)_3$, $Ge(R^C)_3$, $Si(R^C)_2$, $Ge(R^C)_2$, $P(R^P)_2$, $P(R^P)$, $N(R^N)_2$, $N(R^N)$, N, O, $OR^C$, S, $SR^C$, S(O), and $S(O)_2$, wherein each of the heteroalkyl and heteroalkylene groups are unsubstituted or substituted by one or more $R^S$.

Examples of unsubstituted $(C_2\text{-}C_{40})$heterocycloalkyl are unsubstituted $(C_2\text{-}C_{20})$heterocycloalkyl, unsubstituted $(C_2\text{-}C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-azacyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride (F⁻), chloride (Cl⁻), bromide (Br⁻), or iodide (I⁻).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, or (in heteroatom-containing groups) one or more carbon-nitrogen, carbon-phosphorous, or carbon-silicon double bonds, not including any such double bonds that may be present in substituents $R^S$, if any, or in (hetero) aromatic rings, if any.

Embodiments of this disclosure include catalyst systems that include a metal-ligand complex according to formula (I):

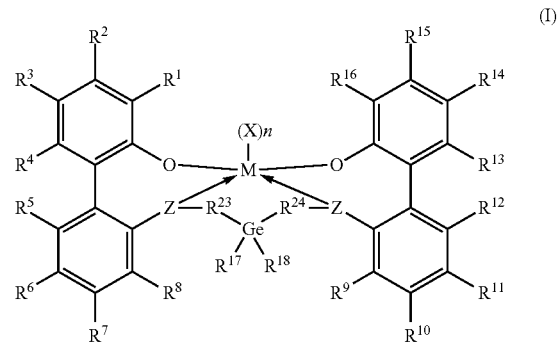

(I)

In formula (I), M is a metal chosen from titanium, zirconium, or hafnium, the metal being in a formal oxidation state of +2, +3, or +4; n is 0, 1, or 2; when n is 1, X is a monodentate ligand or a bidentate ligand; when n is 2, each X is a monodentate ligand and is the same or different; the metal-ligand complex is overall charge-neutral; each Z is independently chosen from —O—, —S—, —N($R^N$)—, or —P($R^P$)—; $R^1$ and $R^{16}$ are independently selected from the group consisting of —H, $(C_1\text{-}C_{40})$hydrocarbyl, $(C_1\text{-}C_{40})$heterohydrocarbyl, —Si$(R^C)_3$, —Ge$(R^C)_3$, —P$(R^P)_2$, —N$(R^N)_2$, —$R^C$, —$SR^C$, —$NO_2$, —CN, —$CF_3$, $R^C$S(O)—, $R^C$S(O)₂—, $(R^C)_2$C=N—, $R^C$C(O)O—, $R^C$OC(O)—, $R^C$C(O)N($R^N$)—, $(R^N)_2$NC(O)—, halogen, radicals having formula (II), radicals having formula (III), and radicals having formula (IV):

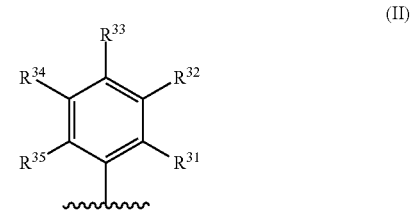

(II)

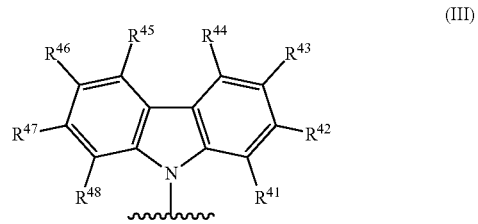

(III)

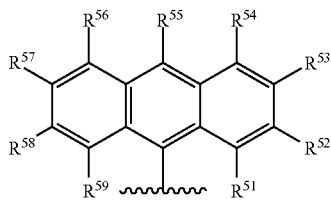

(IV)

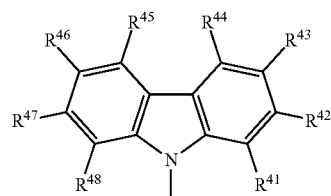

(III)

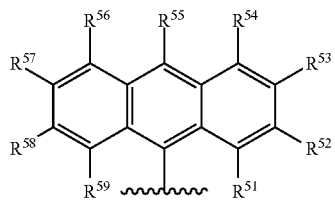

(IV)

In formulas (II), (III), and (IV), each of $R^{31-35}$, $R^{41-48}$, or $R^{51-59}$ is independently chosen from $(C_1-C_{40})$hydrocarbyl, $(C_1-C_{40})$heterohydrocarbyl, $-Si(R^C)_3$, $-Ge(R^C)_3$, $-P(R^P)_2$, $-N(R^N)_2$, $-N=CHR^C$, $-OR^C$, $-SR^C$, $-NO_2$, $-CN$, $-CF_3$, $R^CS(O)-$, $R^CS(O)_2-$, $(R^C)_2C=N-$, $R^CC(O)O-$, $R^COC(O)-$, $R^CC(O)N(R^N)-$, $(R^N)_2NC(O)-$, halogen, or $-H$, provided at least one of $R^1$ or $R^{16}$ is a radical having formula (II), formula (III), or formula (IV).

In formula (I), each of $R^{2-4}$, $R^{5-8}$, $R^{9-12}$, and $R^{13-15}$ is independently chosen from $(C_1-C_{40})$hydrocarbyl, $(C_1-C_{40})$heterohydrocarbyl, $-Si(R^C)_3$, $-Ge(R^C)_3$, $-P(R^P)_2$, $-N(R^N)_2$, $-N=CHR^C$, $-OR^C$, $-SR^C$, $-NO_2$, $-CN$, $-CF_3$, $R^CS(O)-$, $R^CS(O)_2-$, $(R^C)_2C=N-$, $R^CC(O)O-$, $R^COC(O)-$, $R^CC(O)N(R^N)-$, $(R^N)_2NC(O)-$, halogen, and $-H$; $R^{17}$ and $R^{18}$ are independently $(C_2-C_{40})$hydrocarbyl, provided that when both $R^{17}$ and $R^{18}$ are ethyl, not more than two of $R^{5-7}$ are fluorine or not more than two of $R^{10-12}$ are fluorine; optionally $R^{17}$ and $R^{18}$ are joined to form a $(C_3-C_{50})$hydrocarbylene. $R^{23}$ and $R^{24}$ are independently selected from $-(CR^C_2)_m-$, where m is independently 1 or 2; each $R^C$, $R^P$, and $R^N$ in formula (I) is independently a $(C_1-C_{30})$hydrocarbyl, $(C_1-C_{30})$heterohydrocarbyl, or $-H$.

In some embodiments, in the metal-ligand complex of formula (I), $R^8$ and $R^9$ are hydrogen, and $R^{23}$ and $R^{24}$ are independently selected from a $-(CR^C_2)_m-$, where m is 1 or 2. In some embodiments, in the metal-ligand complex of formula (I), $R^{17}$ and $R^{18}$ are independently $(C_2-C_{40})$hydrocarbyl. In other embodiments, $R^{17}$ and $R^{18}$ are independently ethyl, 1-propyl, 2-propyl, 1,1-dimethylethyl, cyclopentyl, or cyclohexyl. In some embodiments, germanium may be substituted with ethyl, propyl, iso-propyl, butyl, tert-butyl, pentyl, hexyl, heptyl, octyl, or nonyl.

In one or more embodiments, $R^3$ and $R^{14}$ are independently chosen from a $(C_1-C_9)$alkyl. In some embodiments, $R^3$ and $R^{14}$ are independently methyl, tert-octyl (also called 2,4,4-trimethylpent-2-yl), or n-octyl. In some embodiments of the metal-ligand complex of formula (I), $R^7$, $R^8$, $R^9$, and $R^{10}$ are $-H$.

In some embodiments, in the metal-ligand complex of formula (I), either one of $R^1$ or $R^{16}$, or both $R^1$ and $R^{16}$, are chosen from radicals having formula (II), formula (III), or formula (IV):

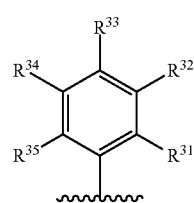

(II)

When present in the metal-ligand complex of formula (I) as part of a radical having formula (II), formula (III), or formula (IV), the groups $R^{31-35}$, $R^{41-48}$, and $R^{51-59}$ of the metal-ligand complex of formula (I) are each independently chosen from $(C_1-C_{40})$hydrocarbyl, $(C_1-C_{40})$heterohydrocarbyl, $Si(R^C)_3$, $P(R^P)_2$, $N(R^N)_2$, $OR^C$, $SR^C$, $NO_2$, $CN$, $CF_3$, $R^CS(O)-$, $R^CS(O)_2-$, $(R^C)_2C=N-$, $R^CC(O)O-$, $R^COC(O)-$, $R^CC(O)N(R^N)-$, $(R^N)_2NC(O)-$, halogen, hydrogen (H), or combinations thereof. Independently each $R^C$, $R^P$, and $R^N$ are unsubstituted $(C_1-C_{18})$hydrocarbyl, $(C_1-C_{30})$heterohydrocarbyl, or $-H$.

In some embodiments, any or all of the chemical groups (e.g., X, $R^{1-59}$ and Z) of the metal-ligand complex of formula (I) may be unsubstituted. In other embodiments, none, any, or all of the chemical groups X, $R^{1-59}$ and Z of the metal-ligand complex of formula (I) may be substituted with one or more than one $R^S$. When two or more than two $R^S$ are bonded to a same chemical group of the metal-ligand complex of formula (I), the individual $R^S$ of the chemical group may be bonded to the same carbon atom or heteroatom or to different carbon atoms or heteroatoms. In some embodiments, none, any, or all of the chemical groups X, $R^{1-59}$ and Z may be persubstituted with $R^S$. In the chemical groups that are persubstituted with $R^S$, the individual $R^S$ may all be the same or may be independently chosen.

The groups $R^1$ and $R^{16}$ in the metal-ligand complex of formula (I) are chosen independently of one another. For example, $R^1$ may be chosen from a radical having formula (II), (III), or (IV) and $R^{16}$ may be a $(C_1-C_{40})$hydrocarbyl; or $R^1$ may be chosen from a radical having formula (II), (III), or (IV) and $R^{16}$ may be chosen from a radical having formula (II), (III), or (IV) the same as or different from that of $R^1$. Both $R^1$ and $R^{16}$ may be radicals of formula (II), for which the groups $R^{31-35}$ are the same or different in $R^1$ and $R^{16}$. In other examples, both $R^1$ and $R^{16}$ may be radicals of formula (III), for which the groups $R^{41-48}$ are the same or different in $R^1$ and $R^{16}$; or both $R^1$ and $R^{16}$ may be radicals of formula (IV), for which the groups $R^{51-59}$ are the same or different in $R^1$ and $R^{16}$.

In some embodiments, at least one of $R^1$ and $R^{16}$ is a radical having formula (II), where $R^{32}$ and $R^{34}$ are tert-butyl.

In some embodiments, when at least one of $R^1$ or $R^{16}$ is a radical having formula (III), one of or both of $R^{43}$ and $R^{46}$ is tert-butyl and each of $R^{41-42}$, $R^{44-45}$, and $R^{47-48}$ are $-H$. In other embodiments, one of or both of $R^{42}$ and $R^{47}$ is tert-butyl and $R^{41}$, $R^{43-46}$, and $R^{48}$ are $-H$. In some embodiments, both $R^{42}$ and $R^{47}$ are $-H$.

In some embodiments, $R^3$ and $R^{14}$ are tert-octyl, n-octyl, methyl, ethyl, propyl, 2-propyl, butyl, 1,1-dimethylethyl (or tert-butyl). In other embodiments, $R^6$ and $R^{11}$ are halogen. In some embodiments, $R^3$ and $R^{14}$ are methyl; and $R^6$ and $R^{11}$ are halogen.

In some embodiments of the metal-ligand complex of formula (I), when $R^{5-7}$ are fluorine, not more than one of $R^{10-12}$ is fluorine. In other embodiments, when $R^{10-12}$ are fluorine, not more than one of $R^{5-7}$ is fluorine. In other embodiments, fewer than four of $R^{5-7}$ and $R^{10-12}$ are fluorine. In one or more embodiments, $R^7$, $R^8$, $R^9$, and $R^{10}$ are —H. In some embodiments, $R^7$ and $R^{10}$ are halogen. In some embodiments, two of $R^{5-7}$ are fluorine and two of $R^{10-12}$ are fluorine.

In one or more embodiments, $R^{17}$ and $R^{18}$ are $(C_3-C_{50})$ hydrocarbyl, including 2-propyl, tert-butyl, cyclopentyl or cyclohexyl.

The M in the metal-ligand complex of formula (I) may be a transition metal such as titanium (Ti), zirconium (Zr), or hafnium (Hf), and the transition metal may have a formal oxidation state of +2, +3, or +4. The subscript n of $(X)_n$, referring to a number of ligands X bonded to or associated with the metal M, is an integer of from 1, 2, or 3.

The metal M in the metal-ligand complex of formula (I) may be derived from a metal precursor that is subsequently subjected to a single-step or multi-step synthesis to prepare the metal-ligand complex. Suitable metal precursors may be monomeric (one metal center), dimeric (two metal centers), or may have a plurality of metal centers greater than two, such as 3, 4, 5, or more than 5 metal centers. Specific examples of suitable hafnium and zirconium precursors, for example, include, but are not limited to $HfCl_4$, $HfMe_4$, $Hf(CH_2Ph)_4$, $Hf(CH_2CMe_3)_4$, $Hf(CH_2SiMe_3)_4$, $Hf(CH_2Ph)_3Cl$, $Hf(CH_2CMe_3)_3Cl$, $Hf(CH_2SiMe_3)_3Cl$, $Hf(CH_2Ph)_2Cl_2$, $Hf(CH_2CMe_3)_2Cl_2$, $Hf(CH_2SiMe_3)_2Cl_2$, $Hf(NMe_2)_4$, $Hf(NEt_2)_4$, and $Hf(N(SiMe_3)_2)_2Cl_2$; $ZrCl_4$, $ZrMe_4$, $Zr(CH_2Ph)_4$, $Zr(CH_2CMe_3)_4$, $Zr(CH_2SiMe_3)_4$, $Zr(CH_2Ph)_3Cl$, $Zr(CH_2CMe_3)_3Cl$, $Zr(CH_2SiMe_3)_3Cl$, $Zr(CH_2Ph)_2Cl_2$, $Zr(CH_2CMe_3)_2Cl_2$, $Zr(CH_2SiMe_3)_2Cl_2$, $Zr(NMe_2)_4$, $Zr(NEt_2)_4$, $Zr(NMe_2)_2Cl_2$, $Zr(NEt_2)_2Cl_2$, $Zr(N(SiMe_3)_2)_2Cl_2$, $TiBn_4$, $TiCl_4$ and $Ti(CH_2Ph)_4$. Lewis base adducts of these examples are also suitable as metal precursors, for example, ethers, amines, thioethers, and phosphines are suitable as Lewis bases. Specific examples include $HfCl_4(THF)_2$, $HfCl_4(SMe_2)_2$ and $Hf(CH_2Ph)_2Cl_2(OEt_2)$. Activated metal precursors may be ionic or zwitterionic compounds, such as $(M(CH_2Ph)_3^+)(B(C_6F_5)_4^-)$ or $(M(CH_2Ph)_3^+)$ $(PhCH_2B(C_6F_5)_3^-)$ where M is defined above as being Hf or Zr.

In the metal-ligand complex according to formula (I), each X bonds with M through a covalent bond, a dative bond, or an ionic bond. When n is 1, X may be a monodentate ligand or a bidentate ligand; when n is 2, each X is an independently chosen monodentate ligand and may be the same as or different from other groups X. In general, the metal-ligand complex according to formula (I) is overall charge-neutral. In some embodiments, the monodentate ligand may be a monoanionic ligand. Monoanionic ligands have a net formal oxidation state of −1. Each monoanionic ligand may independently be hydride, $(C_1-C_{40})$hydrocarbyl carbanion, $(C_1-C_{40})$heterohydrocarbyl carbanion, halide, nitrate, $HC(O)O^-$, $HC(O)N(H)^-$, $(C_1-C_{40})$hydrocarbylC(O)O$^-$, $(C_1-C_{40})$hydrocarbylC(O)N((C_1-C_{20})hydrocarbyl)$^-$, $(C_1-C_{40})$hydrocarbylC(O)N(H)$^-$, $R^KR^LB^-$, $R^KR^LN^-$, $R^KO^-$, $R^KS^-$, $R^KR^LP^-$, or $R^MR^KR^LSi^-$, where each $R^K$, $R^L$, and $R^M$ independently is hydrogen, $(C_1-C_{40})$hydrocarbyl, or $(C_1-C_{40})$heterohydrocarbyl, or $R^K$ and $R^L$ are taken together to form a $(C_2-C_{40})$hydrocarbylene or $(C_1-C_{20})$heterohydrocarbylene and $R^M$ is as defined above.

In other embodiments, at least one monodentate ligand X, independently from any other ligands X, may be a neutral ligand. In specific embodiments, the neutral ligand is a neutral Lewis base group such as $R^XNR^KR^L$, $R^KOR^L$, $R^KSR^L$, or $R^XPR^KR^L$, where each $R^X$ independently is hydrogen, $(C_1-C_{10})$hydrocarbyl-Si[$(C_1-C_{10})$hydrocarbyl]$_3$ (i.e. —$CH_2Si(Me)_3$), $(C_1-C_{40})$hydrocarbyl, $[(C_1-C_{10})$hydrocarbyl]$_3$Si—, or $(C_1-C_{40})$heterohydrocarbyl and each $R^K$ and $R^L$ independently is as defined above.

Additionally, each X can be a monodentate ligand that, independently from any other ligands X, is a halogen, unsubstituted $(C_1-C_{20})$hydrocarbyl, unsubstituted $(C_1-C_{20})$hydrocarbylC(O)O—, or $R^KR^LN$—, wherein each of $R^K$ and $R^L$ independently is an unsubstituted$(C_1-C_{20})$hydrocarbyl. In some embodiments, each monodentate ligand X is a chlorine atom, $(C_1-C_{10})$hydrocarbyl (e.g., $(C_1-C_6)$alkyl or benzyl), unsubstituted $(C_1-C_{10})$hydrocarbylC(O)O—, or $R^KR^LN$—, wherein each of $R^K$ and $R^L$ independently is an unsubstituted $(C_1-C_{10})$hydrocarbyl.

In further embodiments in which n is 2 or greater than 2, such that there are at least two groups X, any two groups X may be joined to form a bidentate ligand. In illustrative embodiments including a bidentate ligand, the bidentate ligand may be a neutral bidentate ligand. In one embodiment, the neutral bidentate ligand is a diene of formula $(R^D)_2C=C(R^D)-C(R^D)=C(R^D)_2$, wherein each $R^D$ independently is H, unsubstituted $(C_1-C_6)$alkyl, phenyl, or naphthyl. In some embodiments the bidentate ligand is a monoanionic-mono (Lewis base) ligand. In some embodiments, the bidentate ligand is a dianionic ligand. The dianionic ligand has a net formal oxidation state of −2. In one embodiment, each dianionic ligand independently is carbonate, oxalate (i.e., $^-O_2CC(O)O^-$), $(C_2-C_{40})$hydrocarbylene dicarbanion, $(C_1-C_{40})$heterohydrocarbylene dicarbanion, phosphate, or sulfate.

In further embodiments, X is selected from methyl; ethyl; 1-propyl; 2-propyl; 1-butyl; 2,2,-dimethylpropyl; trimethylsilylmethyl; phenyl; benzyl; or chloro. In some embodiments n is 2 and each X is the same. In some instances, at least two X are different from each other. In other embodiments n is 2 and each X is a different one of methyl; ethyl; 1-propyl; 2-propyl; 1-butyl; 2,2,-dimethylpropyl; trimethylsilylmethyl; phenyl; benzyl; and chloro. In one embodiment, n is 2 and at least two X independently are monoanionic monodentate ligands. In a specific embodiment, n is 2 and the two X groups join to form a bidentate ligand. In further embodiments, the bidentate ligand is 2,2-dimethyl-2-silapropane-1,3-diyl or 1,3-butadiene.

In the metal-ligand complex of formula (I), each Z independently is O, S, $N(C_1-C_{40})$hydrocarbyl, or $P(C_1-C_{40})$hydrocarbyl. In some embodiments, each Z is different. For example, one Z is O and the other Z is $NCH_3$. In some embodiments, one Z is O and one Z is S. In another embodiment, one Z is S and one Z is $N(C_1-C_{40})$hydrocarbyl, (for example, $NCH_3$). In a further embodiment, each Z is the same. In yet another embodiment, each Z is O. In another embodiment, each Z is S.

In specific embodiments of catalyst systems, the metal-ligand complex according to formula (I) may include, without limitation, a complex having the structure of any of Procatalysts 1-9:

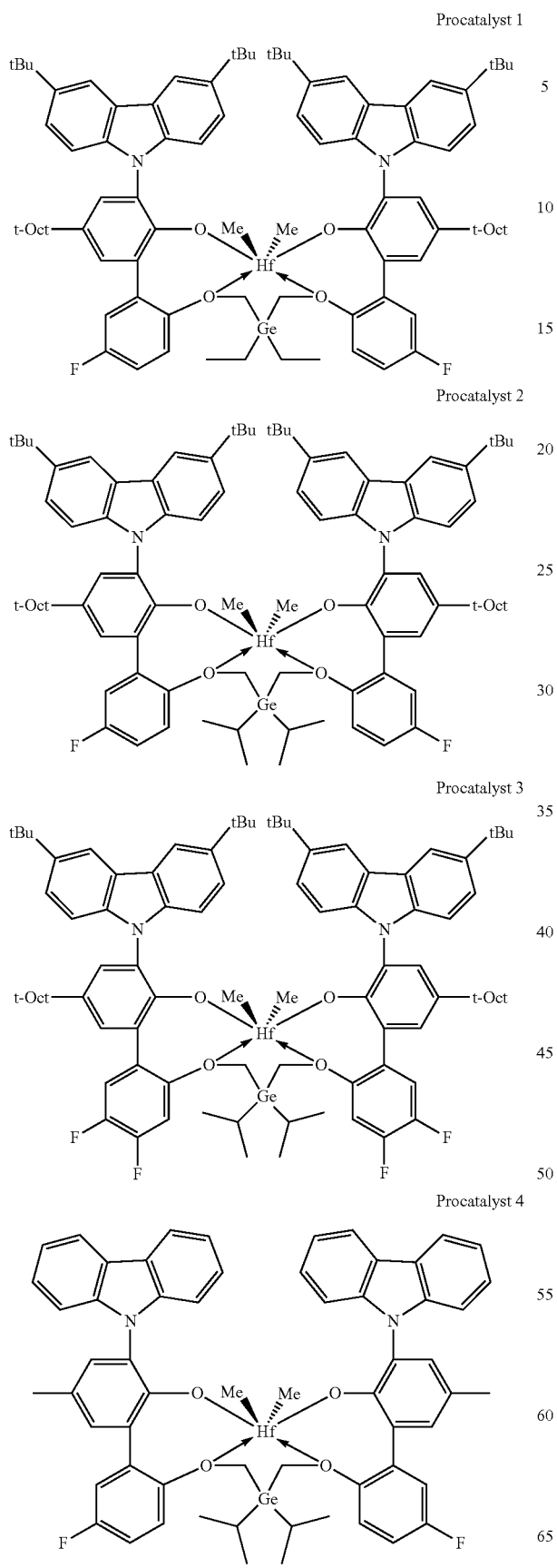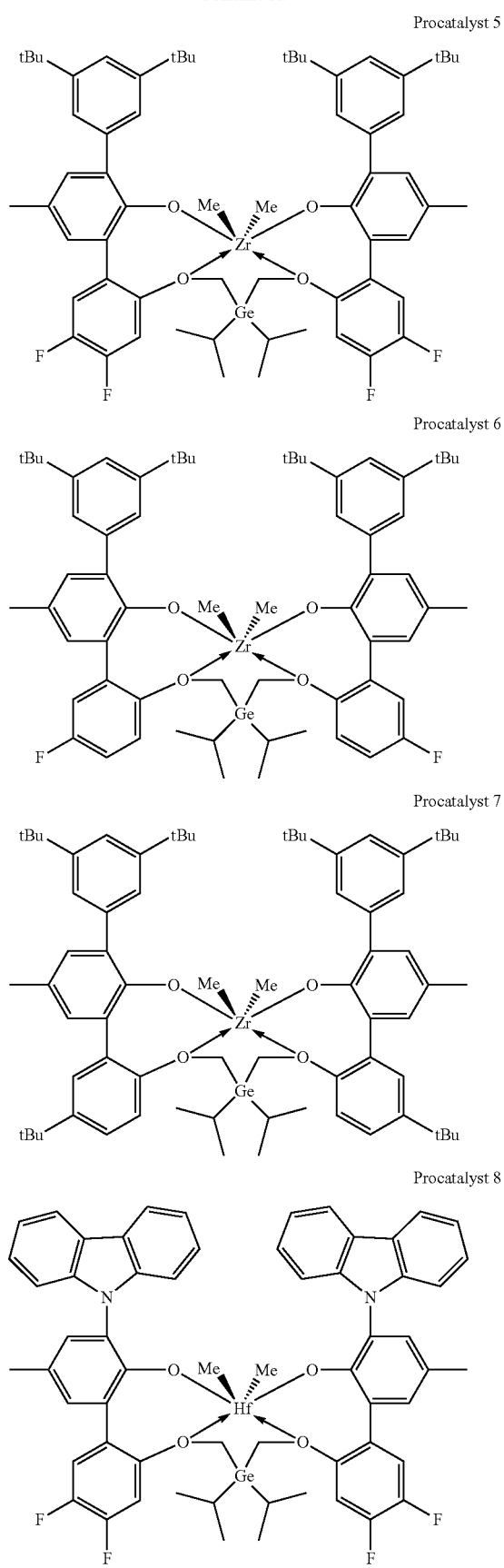

Procatalyst 9

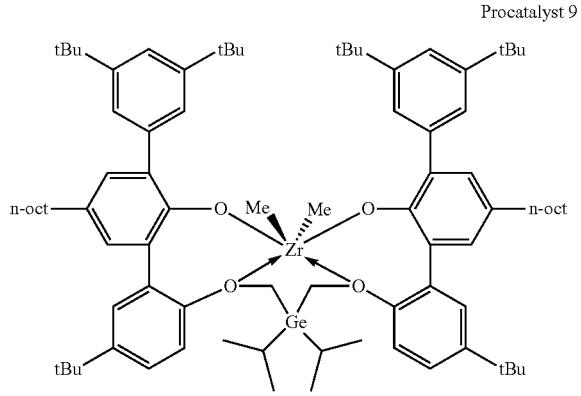

In the metal-ligand complexes, Procatalysts 1-9, the germanium atom is part of a germanium bridge that covalently connects one oxygen atom to another oxygen atom (the two groups Z of formula (I)). Each substituent $R^{17}$ and $R^{18}$ are independently $(C_2-C_{40})$hydrocarbyl.

Procatalyst Activation

The catalyst systems of this disclosure include a metal-ligand complex according to formula (I). The metal-ligand complex according to formula (I) may be in a catalytically active form or in a procatalyst form that is catalytically inactive or is at least substantially less catalytically active than the catalytically active form. The procatalysts 1-7 are catalytically inactive forms of various metal-ligand complexes according to formula (I). The procatalyst system comprising the metal-ligand complex of formula (I) in a procatalyst form may be rendered catalytically active by any technique known in the art for activating metal-based catalysts of olefin polymerization reactions. For example, a metal-ligand complex of formula (I) may be rendered catalytically active by contacting the metal-ligand complex to, or combining the metal-ligand complex with, an activating co-catalyst. Another example of a suitable activating technique includes bulk electrolysis. Combinations of one or more of the foregoing activating co-catalysts and techniques are also contemplated. Subjecting a metal-ligand complex according to formula (I) in a procatalyst form to any of such activating techniques results in a catalytically activated form of the metal-ligand complex according to formula (I). In some embodiments, the catalytically activated form of the metal-ligand complex according to formula (I) may be the result of cleaving at least one X from the procatalyst form of the metal-ligand complex according to formula (I) by any of the foregoing activation techniques.

Co-Catalyst Component

Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methyl-alumoxane, and isobutylalumoxane.

Lewis acid activators (co-catalysts) include Group 13 metal compounds containing from 1 to 3 $(C_1-C_{20})$hydrocarbyl substituents as described herein. In one embodiment, Group 13 metal compounds are tri$((C_1-C_{20})$hydrocarbyl)-substituted-aluminum, tri$((C_1-C_{20})$hydrocarbyl)-boron compounds, tri$((C_1-C_{10})$alkyl)aluminum, tri$((C_6-C_{18})$aryl)boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tetrakis$((C_1-C_{20})$hydrocarbyl borate or a tri$((C_1-C_{20})$hydrocarbyl)ammonium tetrakis$((C_1-C_{20})$hydrocarbyl)borate (e.g. bis(octadecyl)methylammonium tetrakis(pentafluorophenyl)borate). As used herein, the term "ammonium" means a nitrogen cation that is a $((C_1-C_{20})$hydrocarbyl$)_4N^+$ a $((C_1-C_{20})$hydrocarbyl$)_3N(H)^+$, a $((C_1-C_{20})$hydrocarbyl$)_2N(H)_2^+$, $((C_1-C_{20})$hydrocarbylN(H)$_3^+$, or $N(H)_4^+$, wherein each $(C_1-C_{20})$hydrocarbyl, when two or more are present, may be the same or different.

Combinations of neutral Lewis acid activators (co-catalysts) include mixtures comprising a combination of a tri$((C_1-C_4)$alkyl)aluminum and a halogenated tri$((C_6-C_{18})$aryl)boron compound, especially a tris(pentafluorophenyl)borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex):(tris(pentafluoro-phenylborane): (alumoxane) [e.g., (Group 4 metal-ligand complex):(tris(pentafluoro-phenylborane):(alumoxane)] are from 1:1:1 to 1:10:1.00, in other embodiments, from 1:1:1.5 to 1:5:30.

The catalyst system comprising the metal-ligand complex of formula (I) may be activated to form an active catalyst composition by combination with one or more co-catalysts, for example, a cation forming co-catalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to: modified methyl aluminoxane (MMAO), bis(hydrogenated tallow alkyl)methyl tetrakis(pentafluorophenyl)borate(1$^-$) amine (i.e. [HNMe$(C_{18}H_{37})_2$][B$_6$F$_5$)$_4$]), and combinations of both.

In some embodiments, one or more of the foregoing activating co-catalysts are used in combination with each other. An especially preferred combination is a mixture of a tri$((C_1-C_4)$hydrocarbyl)aluminum, tri$((C_1-C_4)$hydrocarbyl) borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl)borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Polyolefins

The catalytic systems described in the preceding paragraphs are utilized in the polymerization of olefins, primarily ethylene and propylene. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, and 4-methyl-1-pentene, ethylidene norbornene. For example, the one or more α-olefin co-monomers may be selected from the group consisting of propylene, 1-butene, 1-hexene, and 1-octene; or in the alternative, from the group consisting of 1-hexene and 1-octene.

The ethylene based polymers, for example homopolymers and/or interpolymers (including copolymers) of ethylene and optionally one or more co-monomers such as α-olefins, may comprise at least 50 percent by weight of units derived from ethylene. All individual values and subranges encompassed by "from at least 50 weight percent" are disclosed herein as separate embodiments; for example, the ethylene based polymers, homopolymers and/or interpolymers (including copolymers) of ethylene and optionally one or more co-monomers such as α-olefins may comprise at least 60 percent by weight of units derived from ethylene; at, least 70 percent by weight of units derived from ethylene; at least 80 percent by weight of units derived from ethylene; or from 50 to 100 percent by weight of units derived from ethylene; or from 80 to 100 percent by weight of units derived from ethylene.

In some embodiments, the ethylene based polymers may comprise at least 50 percent by moles of units derived from ethylene. All individual values and subranges from at least 90 mole percent are included herein and disclosed herein as separate embodiments. For example, the ethylene based polymers may comprise at least 93 percent by moles of units derived from ethylene; at least 96 percent by moles of units; at least 97 percent by moles of units derived from ethylene; or in the alternative, from 90 to 100 percent by moles of units derived from ethylene; from 90 to 99.5 percent by moles of units derived from ethylene; or from 97 to 99.5 percent by moles of units derived from ethylene.

In some embodiments of the ethylene based polymer, the amount of additional α-olefin is less than 50%; other embodiments include at least 1 mole percent (mol %) to 20 mol %; and in further embodiments the amount of additional α-olefin includes at least 5 mol % to 10 mol %. In some embodiments, the additional α-olefin is 1-octene.

Any conventional polymerization processes may be employed to produce the ethylene based polymers. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example.

In one embodiment, the ethylene based polymer may be produced via solution polymerization in a dual reactor system, for example a dual loop reactor system, wherein ethylene and optionally one or more α-olefins are polymerized in the presence of the catalyst system, as described herein, and optionally one or more co-catalysts. In another embodiment, the ethylene based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene based polymer may be produced via solution polymerization in a dual reactor system, for example a dual loop reactor system, wherein ethylene and optionally one or more α-olefins are polymerized in the presence of the catalyst system, as described herein, in both reactors. In another embodiment, the ethylene based polymer may be produced via solution polymerization in a single reactor system, for example a single loop reactor system, in which ethylene and optionally one or more α-olefins are polymerized in the presence of the catalyst system, as described within this disclosure, and optionally one or more co-catalysts, as described in the preceding paragraphs.

In some embodiments, the polymerization process for producing an ethylene-based polymer includes polymerizing ethylene and at least one additional α-olefin in the presence of a catalyst system. In one or more embodiments, the catalyst system may include the metal-ligand complex according to formula (I) in its catalytically active form without a co-catalyst or an additional catalyst. In further embodiments, the catalyst system may include the metal-ligand complex according to formula (I) in its procatalyst form, its catalytically active form, or a combination of both forms, in combination with at least one co-catalyst. In further embodiments, the catalyst system may include the metal-ligand complex according to formula (I) in its procatalyst form in combination with at least one co-catalyst and at least one additional catalyst. In further embodiments, the catalyst system may include a first catalyst and at least one additional catalyst, and, optionally, at least one co-catalyst, where the first catalyst is a metal-ligand complex according to formula (I) in its catalytically active form.

The ethylene based polymers may further comprise one or more additives. Such additives include, but are t limited to, antistatic agents, color enhancers, dyes, lubricants, pigments, primary antioxidants, secondary antioxidants, processing aids, UV stabilizers, and combinations thereof. The ethylene based polymers may contain any amounts of additives. The ethylene based polymers may compromise from about 0 to about 10 percent by the combined weight of such additives, based on the weight of the ethylene based polymers and the one or more additives. The ethylene based polymers may further comprise fillers, which may include, but are not limited to, organic or inorganic fillers. The ethylene based polymers may contain from about 0 to about 20 weight percent fillers such as, for example, calcium carbonate, talc, or $Mg(OH)_2$, based on the combined weight of the ethylene based polymers and all additives or fillers. The ethylene based polymers may further be blended with one or more polymers to form a blend.

In some embodiments, a polymerization process for producing an ethylene-based polymer may include polymerizing ethylene and at least one additional α-olefin in the presence of a catalyst system, wherein the catalyst system incorporates at least one metal-ligand complex of formula (I). The polymer resulting from such a catalyst system that incorporates the metal-ligand complex of formula (I) may have a density according to ASTM D792 (incorporated herein by reference in its entirety) from 0.850 g/cm³ to 0.950 g/cm³, from 0.880 g/cm³ to 0.920 g/cm³, from 0.880 g/cm³ to 0.910 g/cm³, or from 0.880 g/cm³ to 0.900 g/cm³, for example.

In another embodiment, the polymer resulting from the catalyst system that includes the metal-ligand complex of formula (I) may have a melt flow ratio ($I_{10}/I_2$) from 5 to 15, in which melt index $I_2$ is measured according to ASTM D1238 (incorporated herein by reference in its entirety) at 190° C. and 2.16 kg load, and melt index $I_{10}$ is measured according to ASTM D1238 at 190° C. and 10 kg load. In other embodiments the melt flow ratio ($I_{10}/I_2$) is from 5 to 10, and in others, the melt flow ratio is from 5 to 9.

In some embodiments, the polymer resulting from the catalyst system that includes the metal-ligand complex of formula (I) has a molecular-weight distribution (MWD) from 1 to 10, where MWD is defined as $M_w/M_n$ with $M_w$ being a weight-average molecular weight and $M_n$ being a number-average molecular weight. In other embodiments, the polymers resulting from the catalyst system have a MWD from 1 to 6. Another embodiment includes a MWD from 1 to 3; and other embodiments include MWD from 1.5 to 2.5.

Embodiments of the catalyst systems described in this disclosure yield unique polymer properties as a result of the high molecular weights of the polymers formed and the amount of the co-monomers incorporated into the polymers.

One or more features of the present disclosure are illustrated in view of the examples as follows:

EXAMPLES

Example 1

Preparation of 9-(5-methyl-2-((tetrahydro-2H-pyran-2-yl)oxy)-3-(4,4,5,5-tetramethyl-1,3,2-dioxaborolan-2-yl)phenyl)-9H-carbazole

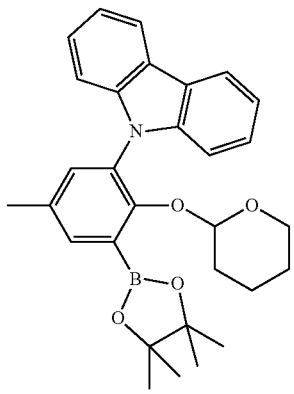 [SMILES: Cc1cc(B2OC(C)(C)C(C)(C)O2)c(OC2CCCCO2)c(-n2c3ccccc3c3ccccc32)c1]

The synthetic procedures of WO 2016/003879 A1 were substantially repeated to prepare 9-(5-methyl-2-((tetrahydro-2H-pyran-2-yl)oxy)-3-(4,4,5,5-tetramethyl-1,3,2-dioxaborolan-2-yl)phenyl)-9H-carbazole.

Example 2

Preparation of 3,6-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole

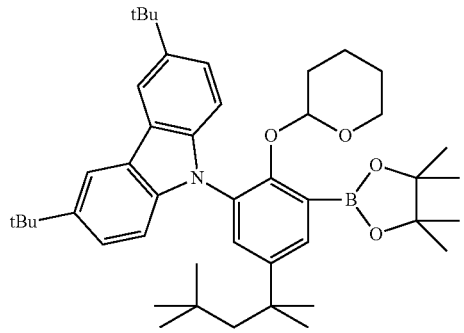 [SMILES: CC(C)(C)CC(C)(C)c1cc(B2OC(C)(C)C(C)(C)O2)c(OC2CCCCO2)c(-n2c3ccc(C(C)(C)C)cc3c3cc(C(C)(C)C)ccc32)c1]

The synthetic procedures of US 20110282018 A1 were substantially repeated to prepare 3,6-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole.

Example 3

Preparation of bis((2-bromo-4-fluorophenoxy)methyl)diethylgermane

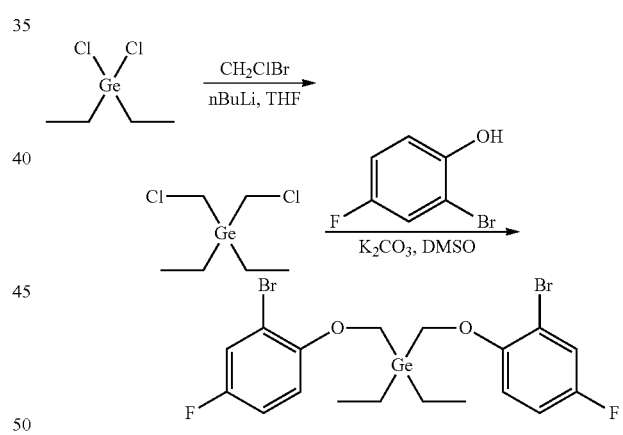

In a glovebox, diethyldichlorogermane (4.033 g, 20.0 mmol, 1.0 equiv) was dissolved in anhydrous THF (120 mL) in a 250 mL single-neck round-bottom flask. The flask was capped with a septum, sealed, removed from the glovebox, and cooled to −78° C. in a dry ice-acetone bath. Bromochloromethane (3.9 mL, 60.0 mmol, 3.0 equiv) was added. A solution of n-BuLi in hexane (2.5 M, 18.4 mL, 46.0 mmol, 2.3 equiv) was added to the cooled wall of the flask over a period of 3 hours using a syringe pump. The mixture was allowed to warm up to room temperature overnight (16 h) and saturated NH₄Cl (30 mL) was added. The two layers were separated. The aqueous layer was extracted with ether (2×50 mL). The combined organic layer was dried over MgSO₄, filtered and concentrated under reduced pressure. The crude product was used for the next step without further purification.

A 100 mL round-bottom flask was charged with the above bis(chloromethyl)diethylgermane (2.3 g, 10 mmol, 1.0 equiv), 2-bromo-4-fluorophenol (5.73 g, 30.0 mmol, 3.0 equiv), K$_2$CO$_3$ (5.53 g, 40.0 mmol, 4.0 equiv), and DMSO (60 mL). The reaction mixture was stirred at 60° C. overnight then at 100° C. for 2 hours. After cooling down to room temperature, the reaction mixture was poured into water to precipitate the product. The resulting emulsion was extracted with DCM. The combined organic layer was dried over MgSO$_4$, filtered, and concentrated by rotary-evaporation. The residue was purified by silica gel column chromatography. A yield of 2.63 g of a colorless oil was collected, providing a 49% yield.

$^1$H NMR (400 MHz, CDCl$_3$) δ 7.28-7.23 (m, 2H), 7.00-6.94 (m, 4H), 4.09 (s, 4H), 1.24-1.08 (m, 10H). $^{19}$F {1H} NMR (376 MHz, CDCl$_3$) δ −122.45 (s, 2F).

Example 4

Preparation of 6',6'''-(((diethylgermanediyl)bis (methylene))bis(oxy))bis(3-(3,6-di-tert-butyl-9H-carbazol-9-yl)-3'-fluoro-5-(2,4,4-trimethylpentan-2-yl)-[1,1'-biphenyl]-2-ol)

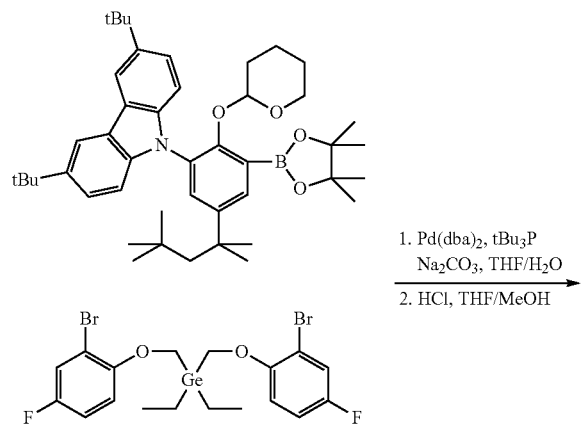
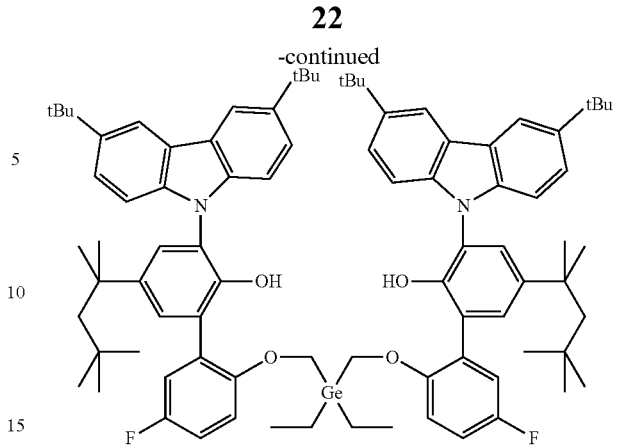

In a glovebox, to a 40 mL vial was added bis((2-bromo-4-fluorophenoxy)methyl)diethylgermane (1.078 g, 2.0 mmol, 1.0 equiv), 3,6-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (4.16 g, 6.0 mmol, 3.0 equiv), Na$_2$CO$_3$ (1.48 g, 14.0 mmol, 7.0 equiv), and degassed THF (12 mL). The vial was removed from the glovebox and water (5 mL) was added. Nitrogen was purged through the stirred solution for 5 minutes to ensure complete degassing. A premixed solution of Pd(dba)$_2$ (0.046 g, 0.08 mmol, 0.04 equiv) and tBu$_3$P (0.032 g, 0.16 mmol, 0.08 equiv) in THF (3 mL) was added. The reaction was then heated to 70° C. for 18 hours. After cooling down to room temperature, the organic layer was transferred to a 100 mL round bottom flask. The vial was rinsed with THF (5 mL). MeOH (15 mL) and concentrated HCl (1.0 mL) were added; the reaction mixture was then refluxed (80-90° C.) for 2 hours. The reaction mixture was concentrated. Water (50 mL) was added and the product was extracted by ether (70 mL×3). The extract was dried over MgSO$_4$ and filtered through a plug of silica gel. After removing solvents, the residue was purified by crystallization in ether/ethanol. A 2.18 g of a white solid was collected providing a 81% yield.

$^1$H NMR (400 MHz, CDCl$_3$) δ 8.23 (d, J=2.0 Hz, 4H), 7.42-7.33 (m, 6H), 7.18 (d, J=2.4 Hz, 2H), 6.96 (d, J=8.6 Hz, 4H), 6.84 (dd, J=8.8, 3.2 Hz, 2H), 6.41-6.31 (m, 2H), 5.65-5.22 (m, 2H), 5.46 (s, 2H), 3.36 (s, 4H), 1.68 (s, 4H), 1.47 (s, 36H), 1.32 (s, 12H), 0.82-0.69 (m, 24H), 0.64-0.52 (m, 4H). $^{19}$F{1H} NMR (376 MHz, CDCl$_3$) δ −123.61 (s, 2F).

Example 5

Preparation of Inventive Procatalyst 1

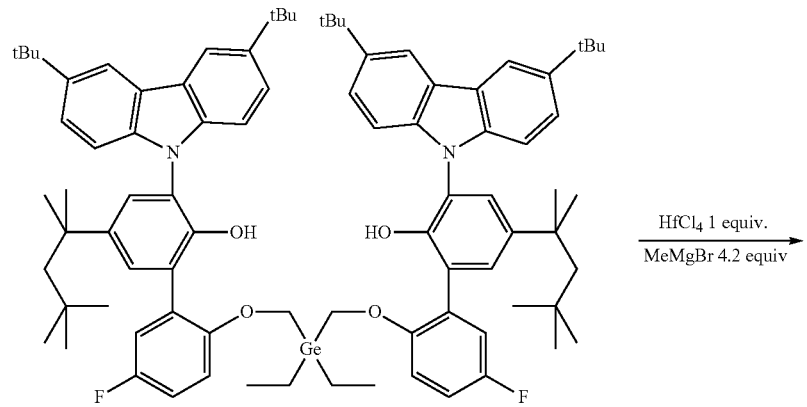

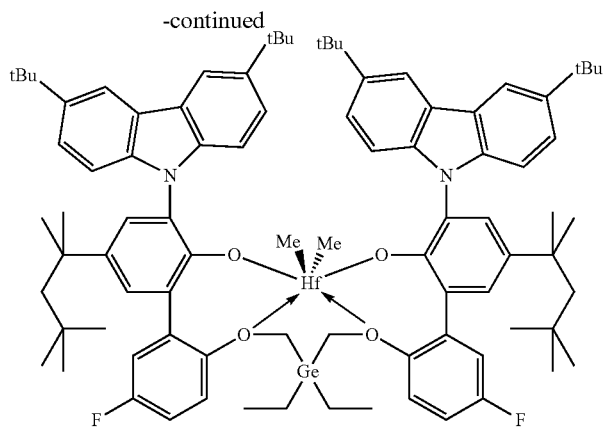

In a glovebox, an oven-dried 40 mL vial with a stir bar was charged with HfCl$_4$ (64 mg, 0.2 mmol, 1.0 equiv) and anhydrous toluene (6.0 mL). The vial was cooled to −30° C. in freezer for at least 30 minutes. The vial was removed from the of freezer. MeMgBr in Et$_2$O (3 M, 0.28 mL, 0.84 mmol, 4.2 equiv) was added to the stirring suspension. After 10 minutes, 6',6'''-(((diethylgermanediyl)bis(methylene))bis(oxy))bis(3-(3,6-di-tert-butyl-9H-carbazol-9-yl)-3'-fluoro-5-(2,4,4-trimethylpentan-2-yl)-[1,1'-biphenyl]-2-ol) (0.269 g, 0.2 mmol, 1.0 equiv) was added as solid. The resulting mixture was stirred at room temperature overnight. Solvents were removed under vacuum to yield a dark solid which was washed with hexanes (8 mL) and then extracted with toluene (12 mL). The toluene extract was dried under vacuum. A yield of 213 mg of a white solid was collected, providing a 69% yield.

$^1$H NMR (400 MHz, C$_6$D$_6$) δ 8.64-8.61 (m, 2H), 8.42 (d, J=1.7 Hz, 2H), 7.68 (d, J=2.5 Hz, 2H), 7.62-7.53 (m, 6H), 7.44 (dd, J=8.7, 1.9 Hz, 2H), 7.31 (d, J=2.5 Hz, 2H), 7.09-6.98 (m, 2H), 6.80-6.70 (m, 2H), 5.25-5.18 (m, 2H), 4.57 (d, J=12.4 Hz, 2H), 3.46 (d, J=12.4 Hz, 2H), 1.62-1.56 (m, 4H), 1.49 (s, 18H), 1.36-1.23 (m, 30H), 0.82 (s, 18H), 0.52 (t, J=8.0 Hz, 6H), 0.22-0.02 (m, 4H), −1.01 (s, 6H). $^{19}$F{1H} NMR (376 MHz, C$_6$D$_6$) δ −116.19 (m, 2F).

Example 6

Preparation of bis(chloromethyl)diisopropylgermane

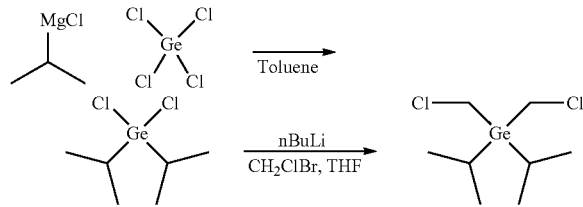

In a glovebox, a 100 mL round bottom flask was charged with GeCl$_4$ (8.578 g, 40 mmol, 1.0 equiv) and dried toluene (50 mL). The flask was capped with a septum, sealed, removed from glovebox, and cooled to −78° C. using a dry ice-acetone bath. Isopropylmagnesium chloride solution in THF (2 M, 41 mL, 82.0 mmol, 2.05 equiv) was added dropwise to the pre-cooled solution. The reaction mixture solidified and was kept at −78° C. for 1 hour, then at room temperature for 3 hours. The reaction mixture was brought into a glovebox and filtered on a frit. The filtrate was collected into a 250 mL round bottom flask. The solids were rinsed with hexane (50 mL). THF (100 mL) was added to the filtrate. The round bottom flask was capped, sealed, removed from the glovebox, and then cooled to −78° C. in a dry ice-acetone bath. Bromochloromethane (7.8 mL, 120.0 mmol, 3.0 equiv) was added. A solution of nBuLi in hexane (2.5 M, 32.8 mL, 82.0 mmol, 2.05 equiv) was added to the cooled wall of the flask over a period of 3 hours using a syringe pump. The mixture was allowed to warm up to room temperature overnight (16 hours). Then saturated aqueous NH$_4$Cl (50 mL) was added. The two layers were separated. The aqueous layer was extracted with ether (2×60 mL). The combined organic layer was dried over MgSO4, filtered through a plug of silica gel, and concentrated under reduced pressure. The crude product was used for the next step without further purification. A yield of 9.3 g of a colorless oil was collected, providing 90% yield.

$^1$H NMR (400 MHz, CDCl$_3$) δ 3.17 (s, 4H), 1.66-1.54 (m, 2H), 1.20 (d, J=7.4 Hz, 12H).

Example 7

Preparation of bis((2-bromo-4-fluorophenoxy)methyl)diisopropylgermane

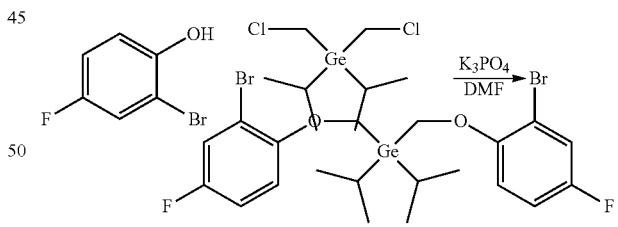

In a glovebox, a 40 mL vial was charged with bis(chloromethyl)diisopropylgermane (4.28 g, 16.6 mmol, 1.0 equiv), 2-bromo-4-fluorophenol (9.514 g, 50.0 mmol, 3.0 equiv), K$_3$PO$_4$ (14.1 g, 66.4 mmol, 4.0 equiv), and DMF (20 mL). The reaction mixture was stirred at 80° C. overnight and then at 100° C. for 2 hours. After cooling down to room temperature, the reaction mixture was poured into water (150 mL). The solution was extracted with ethyl acetate, washed twice with water, then twice with 1 M KOH, and then with brine. The organic layer was dried over MgSO$_4$, filtered through a short plug of silica gel, and concentrated. The crude product was used for next step without purification. A yield of 7.31 g of a colorless oil was collected, providing a 78% yield.

$^1$H NMR (400 MHz, CDCl$_3$) δ 7.29-7.24 (m, 2H), 7.02-6.96 (m, 4H), 4.13 (s, 4H), 1.75-1.62 (m, 2H), 1.27 (d, J=7.4 Hz, 12H). $^{19}$F{1H} NMR (376 MHz, CDCl$_3$) δ −122.60 (s, 2F).

Example 8

Preparation of 6',6'''-((((diisopropylgermanediyl)bis(methylene))bis(oxy))bis(3-(3,6-di-tert-butyl-9H-carbazol-9-yl)-3'-fluoro-5-(2,4,4-trimethylpentan-2-yl)-[1,1'-biphenyl]-2-ol)

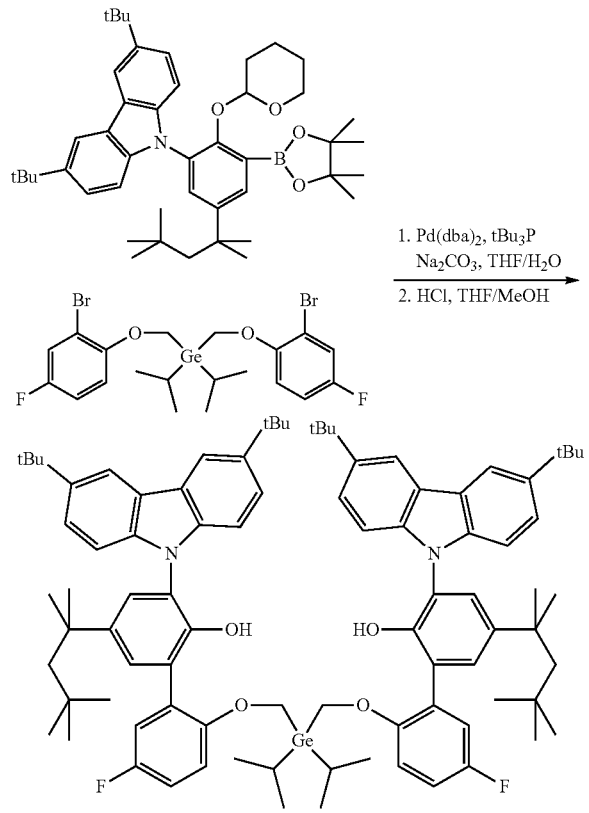

In a glovebox, a 40 mL vial was charged with bis((2-bromo-4-fluorophenoxy)methyl)diisopropylgermane (0.851 g, 1.5 mmol, 1.0 equiv), 3,6-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (3.125 g, 4.5 mmol, 3.0 equiv), Na$_2$CO$_3$ (0.955 g, 9.0 mmol, 6.0 equiv) and degassed THF (9.0 mL). The vial was capped and removed from the glovebox and de-ionized water (4.0 mL) was added. Nitrogen was purged through the stirred reaction mixture for 5 min to ensure complete degassing. A pre-mixed solution of Pd(dba)$_2$ (0.035 g, 0.06 mmol, 0.04 equiv) and tBu$_3$P (0.024 g, 0.12 mmol, 0.08 equiv) in THF (2.0 mL) was then added. The reaction was stirred vigorously at 70° C. for 18 hours. After cooling down to room temperature, the organic layer was transferred to a 100 mL round bottom flask, rinsed the vial with THF (4.0 mL). MeOH (15.0 mL) and concentrated HCl (1.0 mL) were added, then the mixture was refluxed (80-90° C.) for 2 hours. The reaction mixture was concentrated by rotary-evaporation. Water (50 mL) was added and the product was extracted by ether (70 mL×3). The extract was dried over MgSO$_4$ and filtered through a plug of silica gel. After removing solvents, the residue was purified by crystallization in ether/ethanol. A yield 0.73 g of a white solid was collected, providing a 35% yield.

$^1$H NMR (400 MHz, CDCl$_3$) δ 8.24 (d, J=1.9 Hz, 4H), 7.42-7.30 (m, 6H), 7.14 (d, J=2.4 Hz, 2H), 7.02-6.92 (m, 4H), 6.82-6.75 (m, 2H), 6.34-6.23 (m, 2H), 5.50-5.40 (m, 2H), 5.38 (s, 2H), 3.56-3.32 (m, 4H), 1.66 (s, 4H), 1.55 (s, 18H), 1.47 (s, 36H), 1.30 (s, 12H), 1.16-1.06 (m, 2H), 0.82 (d, J=7.4 Hz, 12H), 0.75 (s, 18H). $^{19}$F{1H} NMR (376 MHz, CDCl$_3$) δ −123.93 (s, 2F).

Example 9

Preparation of Inventive Procatalyst 2

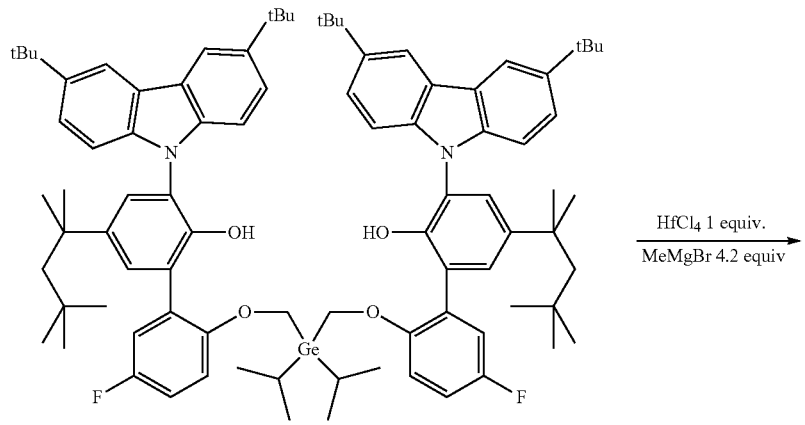

-continued

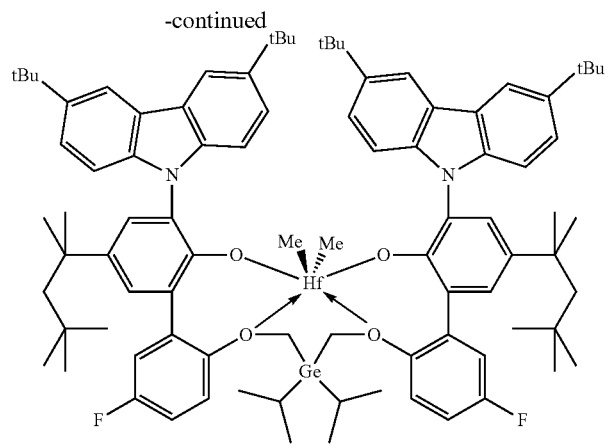

In a glovebox, an oven-dried 40 mL vial with a stir bar was charged with HfCl$_4$ (0.064 g, 0.2 mmol, 1.0 equiv) and anhydrous toluene (6.0 mL). The vial was cooled to −30° C. in freezer for at least 30 minutes. The vial was removed from the freezer. MeMgBr in Et$_2$O (3 M, 0.28 mL, 0.84 mmol, 4.2 equiv) was added to the stirring suspension. After 10 minutes, 6',6'''-(((diisopropylgermanediyl)bis(methylene))bis (oxy))bis (3-(3,6-di-tert-butyl-9H-carbazol-9-yl)-3'-fluoro-5-(2,4,4-trimethylpentan-2-yl)-[1,1'-biphenyl]-2-ol) (0.275 g, 0.2 mmol, 1.0 equiv) was added as solid. The resulting mixture was stirred at room temperature overnight. Solvents were removed under vacuum to yield a dark solid which was extracted with hexanes (12 mL). The extract was concentrated to about 2-3 mL then kept in the freezer for one day. The solvent was decanted and the white solid was dried under vacuum. A 198 mg of a white solid was collected providing a 63% yield.

$^1$H NMR (400 MHz, C$_6$D$_6$) δ 8.63 (d, J=1.8 Hz, 2H), 8.42 (d, J=1.8 Hz, 2H), 7.67-7.50 (m, 8H), 7.44 (dd, J=8.8, 2.0 Hz, 2H), 7.29 (d, J=2.5 Hz, 2H), 7.09 (dd, J=8.9, 3.1 Hz, 2H), 6.84-6.76 (m, 2H), 5.31-5.22 (m, 2H), 4.55 (d, J=12.3 Hz, 2H), 3.52 (d, J=12.3 Hz, 2H), 1.60-1.54 (m, 4H), 1.47 (s, 18H), 1.34-1.25 (m, 30H), 0.84-0.74 (s, 20H), 0.67-0.56 (m, 12H), −1.05 (s, 6H). $^{19}$F{1H} NMR (376 MHz, C$_6$D$_6$) δ −116.34 (m, 2F).

Example 10

Preparation of bis((2-bromo-4,5-difluorophenoxy)methyl)diisopropylgermane

In a glovebox, a 40 mL vial was charged with bis(chloromethyl)diisopropylgermane (4.28 g, 16.6 mmol, 1.0 equiv), 2-bromo-4,5-difluorophenol (10.41 g, 50 mmol, 1.0 equiv), K$_3$PO$_4$ (14.1 g, 66.4 mmol, 4.0 equiv), and DMF (20 mL). The reaction mixture was stirred at 80° C. overnight and then at 100° C. for 2 hours. After cooling down to room temperature, the reaction mixture was poured into water (150 mL). The solution was extracted with ethyl acetate, washed twice with water, then twice with 1 M KOH, and then with brine. The organic layer was dried over MgSO$_4$, filtered through a short plug of silica gel, and concentrated under reduced pressure. The crude product was used for next step without purification. A yield of 8.35 g of a colorless oil was collected, providing an 83% yield.

$^1$H NMR (400 MHz, CDCl$_3$) δ 7.39-7.31 (m, 2H), 6.96-6.88 (m, 2H), 4.10 (s, 4H), 1.75-1.62 (m, 2H), 1.27 (d, J=7.5 Hz, 12H). $^{19}$F{1H} NMR (376 MHz, CDCl$_3$) δ −135.40 (d, J=21.7 Hz, 2F), −146.37 (d, J=21.7 Hz, 2F).

Example 11

Preparation of 6',6'''-(((diisopropylgermanediyl)bis (methylene))bis(oxy))bis(3-(3,6-di-tert-butyl-9H-carbazol-9-yl)-3',4'-difluoro-5-(2,4,4-trimethylpentan-2-yl)-[1,1'-biphenyl]-2-ol)

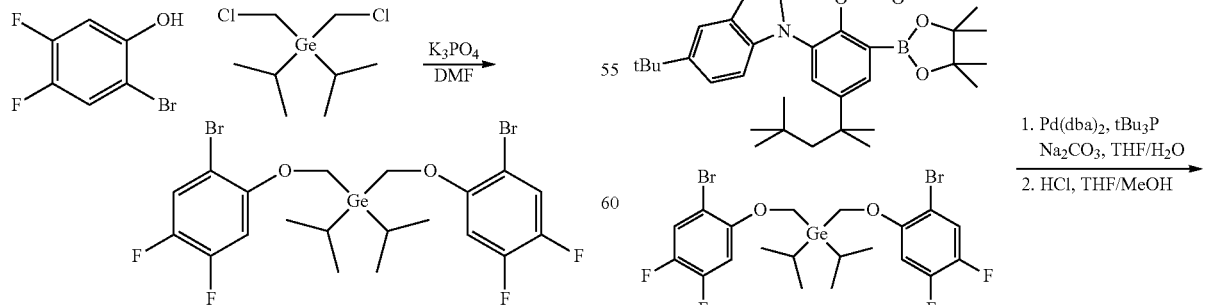

-continued

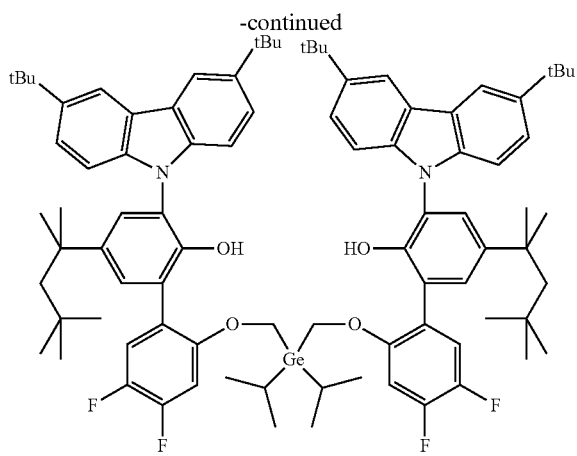

In a glovebox, a 40 mL vial was charged with bis((2-bromo-4,5-difluorophenoxy)methyl)diisopropylgermane (1.508 g, 2.5 mmol, 1.0 equiv), 3,6-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (5.21 g, 7.5 mmol, 3.0 equiv), Na$_2$CO$_3$ (1.59 g, 15.0 mmol, 6.0 equiv), and degassed THF (13.0 mL). The vial was capped and removed from the glovebox and deionized water (6.0 mL) was added. Nitrogen was purged through the stirred reaction mixture for 5 min to ensure complete degassing. A pre-mixed solution of Pd(dba)$_2$ (0.058 g, 0.1 mmol, 0.04 equiv) and tBu$_3$P (0.040 g, 0.2 mmol, 0.08 equiv) in THF (2.0 mL) was then added. The reaction was stirred vigorously at 70° C. for 18 hours. After cooling down to room temperature, the organic layer was transferred to a 100 mL round bottom flask, rinsed the vial with THF (4.0 mL). MeOH (15.0 mL) and concentrated HCl (1.5 mL) were added, then refluxed (80-90° C.) for 2 hours. The reaction mixture was concentrated under reduced pressure. Water (50 mL) was added and the product was extracted by ether (70 mL×3). The extract was dried over MgSO$_4$ and filtered through a plug of silica gel. After removing solvents, the residue was purified by crystallization in ether/methanol. A yield of 2.18 g of a white solid was collected, proving a 62% yield.

$^1$H NMR (400 MHz, CDCl$_3$) δ 8.22 (s, 4H), 7.42-7.34 (m, 6H), 7.14 (d, J=2.4 Hz, 2H), 7.05-6.92 (m, 6H), 5.99-5.84 (m, 2H), 5.32 (s, 2H), 3.47 (s, 4H), 1.68 (s, 4H), 1.45 (s, 36H), 1.32 (s, 12H), 1.13-1.03 (m, 2H), 0.85-0.70 (m, 30H). $^{19}$F{1H} NMR (376 MHz, CDCl$_3$) δ −134.45 (d, J=22.4 Hz, 2F), −147.67 (d, J=22.3 Hz, 2F).

Example 12

Preparation of Inventive Procatalyst 3

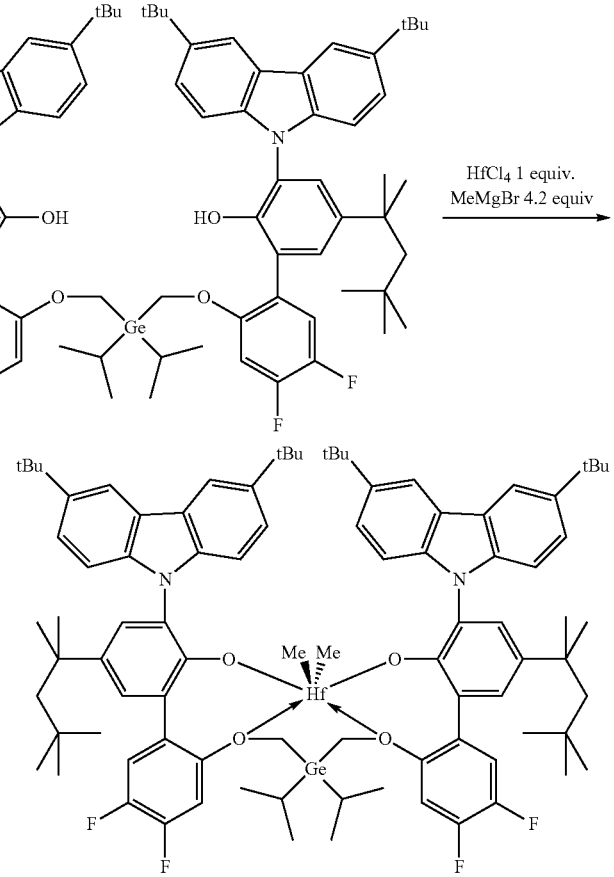

In a glovebox, an oven-dried 40 mL vial with a stir bar was charged with HfCl$_4$ (0.064 g, 0.2 mmol, 1.0 equiv) and anhydrous toluene (6.0 mL). The vial was cooled to −30° C. in freezer for at least 30 minutes. The vial was removed from the freezer. MeMgBr in Et$_2$O (3 M, 0.28 mL, 0.84 mmol, 4.2 equiv) was added to the stirring suspension. After 10 minutes, 6',6'''-(((diisopropylgermanediyl)bis(methylene))bis(oxy))bis(3-(3,6-di-tert-butyl-9H-carbazol-9-yl)-3',4'-difluoro-5-(2,4,4-trimethylpentan-2-yl)-[1,1'-biphenyl]-2-ol) (0.282 g, 0.2 mmol, 1.0 equiv) was added as solid. The resulting mixture was stirred at room temperature overnight. Solvents were removed under vacuum to yield a dark solid which was extracted with hexanes (12 mL). The extract was concentrated to about 2-3 mL then kept in the freezer for one day. The solvent was decanted and the white solid was dried under vacuum. A 246 mg of a white solid was collected providing a 76% yield.

$^1$H NMR (400 MHz, C$_6$D$_6$) δ 8.78-8.74 (m, 2H), 8.50 (d, J=1.8 Hz, 2H), 7.68-7.62 (m, 4H), 7.57-7.51 (m, 4H), 7.47 (dd, J=8.8, 1.9 Hz, 2H), 7.13 (d, J=2.5 Hz, 2H), 7.03-6.94 (m, 2H), 5.34-5.24 (m, 2H), 4.43 (d, J=12.2 Hz, 2H), 3.38 (d, J=12.2 Hz, 2H), 1.60-1.50 (m, 22H), 1.37-1.21 (m, 30H), 0.83-0.72 (m, 20H), 0.67-0.55 (m, 12H), −0.97 (s, 6H). $^{19}$F{1H} NMR (376 MHz, C$_6$D$_6$) δ −134.45 (d, J=22.9 Hz, 2F), −139.91 (d, J=22.7 Hz, 2F).

Example 13

Preparation of 6',6'''-(((diisopropylgermanediyl)bis(methylene))bis(oxy))bis(3-(9H-carbazol-9-yl)-3'-fluoro-5-methyl-[1,1'-biphenyl]-2-ol)

2-yl)oxy)-3-(4,4,5,5-tetramethyl-1,3,2-dioxaborolan-2-yl)phenyl)-9H-carbazole (4.35 g, 9.0 mmol, 3.0 equiv), Na$_2$CO$_3$ (1.91 g, 18.0 mmol, 6.0 equiv) and degassed THF (12.0 mL). The vial was capped and removed from the glovebox and de-ionized water (6.0 mL) was added. Nitrogen was purged through the stirred reaction mixture for 5 min to ensure complete degassing. A pre-mixed solution of Pd(dba)$_2$ (0.069 g, 0.12 mmol, 0.04 equiv) and tBu$_3$P (0.049 g, 0.24 mmol, 0.08 equiv) in THF (2.0 mL) was then added. The reaction was stirred vigorously at 70° C. for 18 hours. After cooling down to room temperature, the organic layer was transferred to a 100 mL round bottom flask, rinsed the vial with THF (4.0 mL). MeOH (15.0 mL) and concentrated HCl (1.0 mL) were added, then the mixture was refluxed (80-90° C.) for 2 hours. The reaction mixture was concentrated by rotary-evaporation. Water (50 mL) was added and the product was extracted by ether (70 mL×3). The extract was dried over MgSO$_4$ and filtered through a plug of silica gel. After removing solvents, the residue was purified by crystallization in ether/methanol. 2.0 g of a white solid was collected providing a 70% yield.

$^1$H NMR (400 MHz, CDCl$_3$) δ 8.22-8.17 (m, 4H), 7.40-7.26 (m, 8H), 7.20-7.10 (m, 6H), 7.04 (dd, J=2.2, 0.8 Hz, 2H), 6.92 (dd, J=8.8, 3.1 Hz, 2H), 6.49-6.39 (m, 2H), 5.92-5.83 (m, 2H), 5.46 (s, 2H), 3.60 (s, 4H), 2.31 (s, 6H), 1.19-1.07 (m, 2H), 0.81 (d, J=7.4 Hz, 12H). $^{19}$F{1H} NMR (376 MHz, CDCl$_3$) δ −123.46 (s, 2F).

Example 14

Preparation of Inventive Procatalyst 4

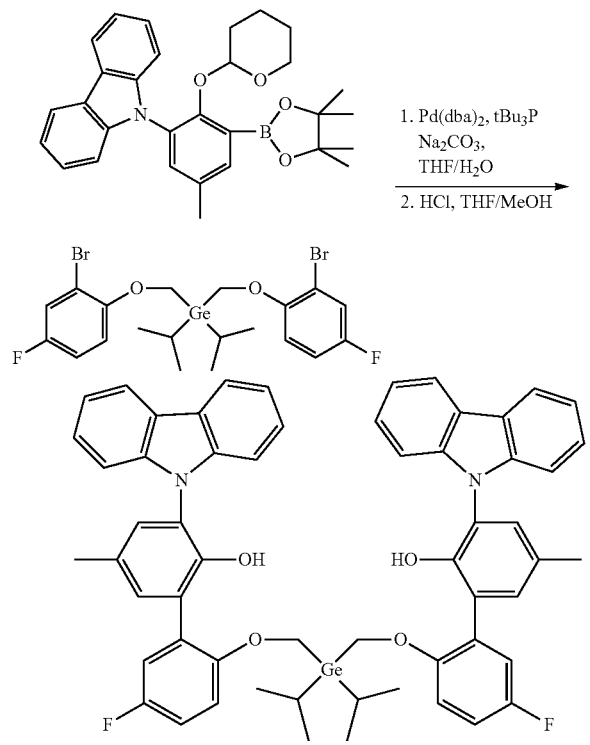

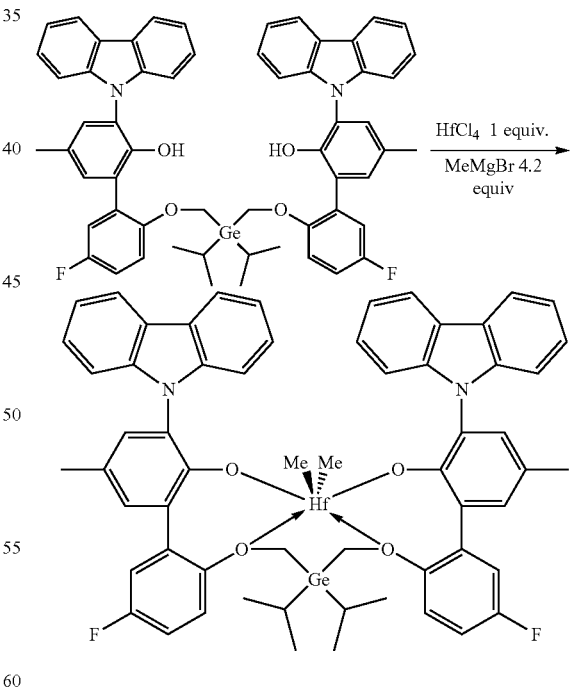

In a glovebox, a 40 mL vial was charged with bis((2-bromo-4-fluorophenoxy)methyl)diisopropylgermane (1.7 g, 3.0 mmol, 1.0 equiv), 9-(5-methyl-2-((tetrahydro-2H-pyran- In a glovebox, an oven-dried 100 mL bottle with a stir bar was suspended HfCl$_4$ (0.641 g, 2.0 mmol, 1.0 equiv) in anhydrous DCM (50 mL). The bottle was cooled to −30° C. in freezer for at least 30 minutes then removed from the freezer. MeMgBr in Et$_2$O (3 M, 2.8 mL, 8.4 mmol, 4.2 equiv) was added to the stirring suspension. After 10 minutes, the ligand 4 was added as solid. The resulting mixture was stirred at room temperature overnight. The reaction mixture was passed through a plug of CELITE™. The plug was washed with DCM (10 mL). Solvent was removed under vacuum to yield a dark brown solid. The solid was washed with hexanes (20 mL), and was then extracted with toluene (50 mL). The toluene extract was dried under vacuum. A yield of 1.86 g of a light tan solid was collected, providing an 80% yield.

$^1$H NMR (400 MHz, CDCl$_3$) δ 8.15-8.10 (m, 2H), 8.06-8.01 (m, 2H), 7.51-7.41 (m, 4H), 7.39-7.32 (m, 2H), 7.28-7.21 (m, 4H), 7.08-6.98 (m, 4H), 6.87-6.80 (m, 4H), 6.71-6.63 (m, 2H), 4.97-4.90 (m, 2H), 4.40 (d, J=12.2 Hz, 2H), 3.33 (d, J=12.3 Hz, 2H), 2.07 (s, 6H), 0.61-0.47 (m, 14H), −1.16 (s, 6H). $^{19}$F{1H} NMR (376 MHz, C$_6$D$_6$) δ −117.07 (s, 2F).

Example 15

Preparation of 6,6'''-(((diisopropylgermanediyl)bis(methylene))bis(oxy))bis(3'',5''-di-tert-butyl-3,4-difluoro-5'-methyl-[1,1':3',1''-terphenyl]-2'-ol)

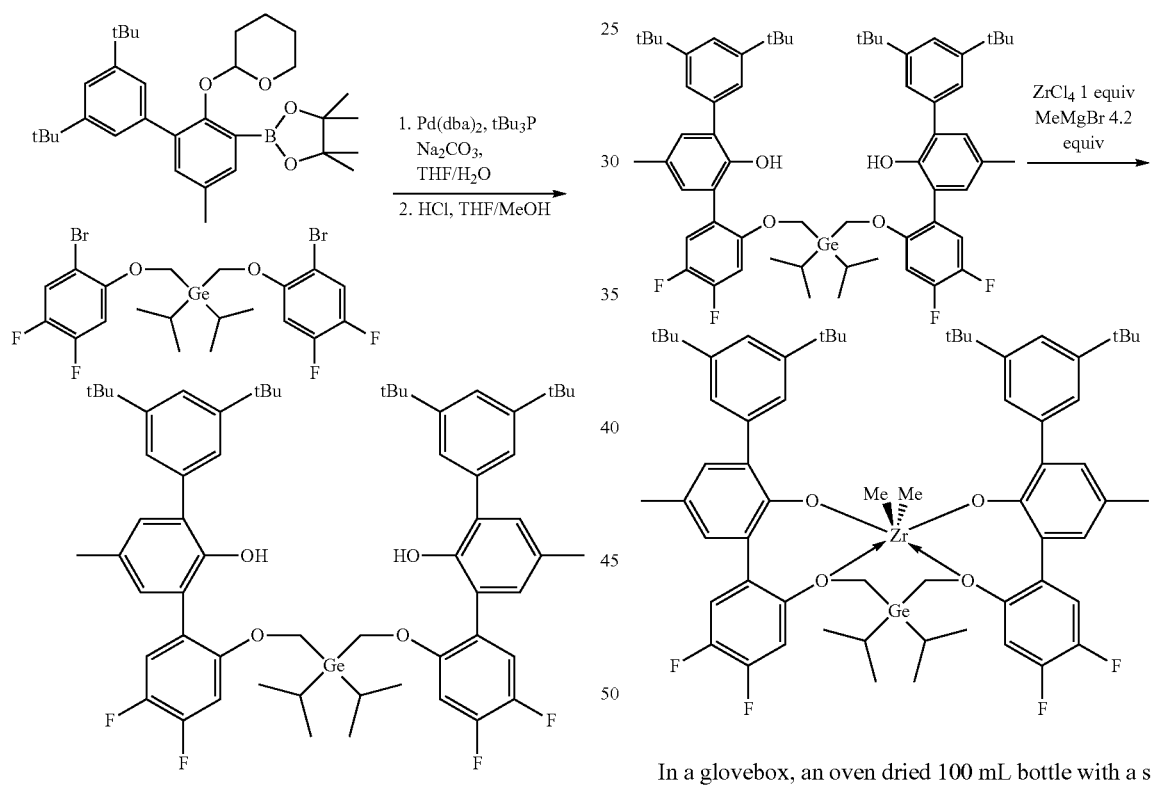

In a glovebox, a 40 mL vial was charged with bis((2-bromo-4,5-difluorophenoxy)methyl)diisopropylgermane (1.508 g, 2.5 mmol, 1.0 equiv), 2-(3',5'-di-tert-butyl-5-methyl-2-((tetrahydro-2H-pyran-2-yl)oxy)-[1,1'-biphenyl]-3-yl)-4,4,5,5-tetramethyl-1,3,2-dioxaborolane (3.8 g, 7.5 mmol, 3.0 equiv), Na$_2$CO$_3$ (1.59 g, 15 mmol, 6.0 equiv), and degassed THF (13 mL). The vial was capped and removed from the glovebox and de-ionized water (6 mL) was added. Nitrogen was purged through the stirred reaction mixture for 5 minutes to ensure complete degassing a pre-mixed solution of Pd(dba)$_2$ (0.058 g, 0.1 mmol, 0.04 equiv) and tBu$_3$P (0.04 g, 0.2 mmol, 0.08 equiv) in THF (2 mL) was added. The reaction was stirred vigorously at 70° C. for 18 hours. After cooling down to room temperature, the organic layer was transferred to a 100 mL round bottom flask, rinsed the vial with THF (4 mL). MeOH (15 mL) and concentrated HCl (1 mL) were added, and was then refluxed (80-90° C.) for 2 hours. The reaction mixture was concentrated under reduced pressure. Water (50 mL) was added and the product was extracted by ether (three times with 70 mL). The extract was dried over MgSO$_4$ and filtered through a plug of silica gel. After removing solvents, the residue was purified by C$_{18}$ reverse phase column chromatography. A yield of 2.12 g of a white solid was collected, providing a 82% yield.

$^1$H NMR (400 MHz, CDCl$_3$) δ 7.43 (t, J=1.8 Hz, 2H), 7.27 (d, J=1.9 Hz, 4H), 7.17-7.08 (m, 4H), 6.86 (d, J=2.0 Hz, 2H), 6.70-6.63 (m, 2H), 5.23 (s, 2H), 3.72 (s, 4H), 2.29 (s, 6H), 1.33 (s, 36H), 1.21-1.11 (m, 2H), 0.81 (d, J=7.4 Hz, 12H). $^{19}$F{1H} NMR (376 MHz, CDCl$_3$) δ −135.72 (d, J=22.4 Hz, 2F), −148.43 (d, J=22.1 Hz, 2F).

Example 16

Preparation of Inventive Procatalyst 5

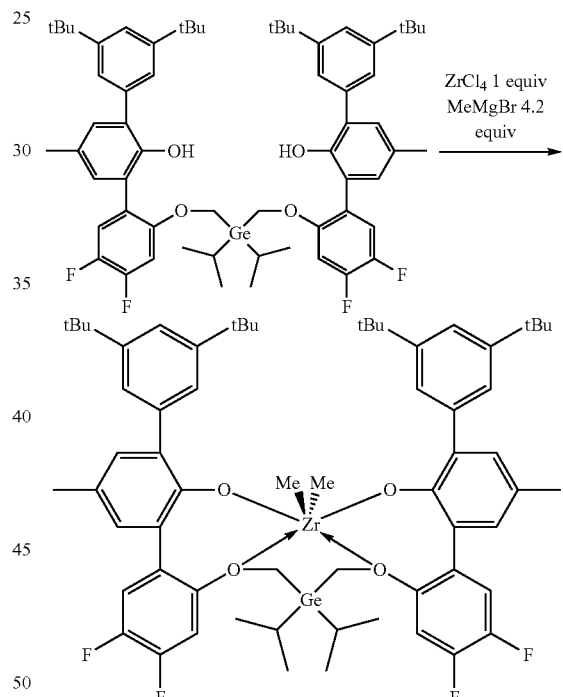

In a glovebox, an oven dried 100 mL bottle with a stir bar was charged with ZrCl$_4$ (0.466 g, 2.0 mmol, 1.0 equiv) and anhydrous toluene (60 mL). The vial was cooled to −30° C. in freezer for at least 30 minutes. The bottle was removed from the freezer. MeMgBr in Et$_2$O (3 M, 2.8 mL, 8.4 mmol, 4.2 equiv) was added to the stirred suspension. After 2 minutes, the ligand was added as solid. The resulting mixture was stirred at room temperature overnight. Solvents were removed under vacuum to yield a dark solid which was washed with hexane (40 mL), extracted with toluene (50 mL) and then twice with 20 mL DCM. The toluene extract was dried under vacuum affording a white solid (0.91 g). The combined DCM extract was dried under vacuum yielding a light brown solid (0.69 g). A yield of 1.6 g was collected, providing a 69% yield.

$^1$H NMR (400 MHz, C$_6$D$_6$) δ 7.85-7.82 (m, 2H), 7.06-6.99 (m, 6H), 6.90 (dd, J=10.8, 8.8 Hz, 2H), 6.72-6.68 (m, 2H), 5.45 (dd, J=10.4, 6.9 Hz, 2H), 4.71 (d, J=11.7 Hz, 2H), 3.52 (d, J=11.6 Hz, 2H), 2.17 (s, 6H), 1.59-1.23 (m, 36H), 0.59-0.51 (m, 12H), 0.48-0.37 (m, 2H), 0.11 (s, 6H). $^{19}$F{1H} NMR (376 MHz, CDCl$_3$) δ −133.64 (d, J=22.5 Hz, 2F), −140.19 (d, J=22.4 Hz, 2F).

Example 17

Preparation of 6",6""'-(((diisopropylgermanediyl)bis(methylene))bis(oxy))bis(3,5-di-tert-butyl-3"-fluoro-5'-methyl-[1,1':3',1"-terphenyl]-2'-ol)

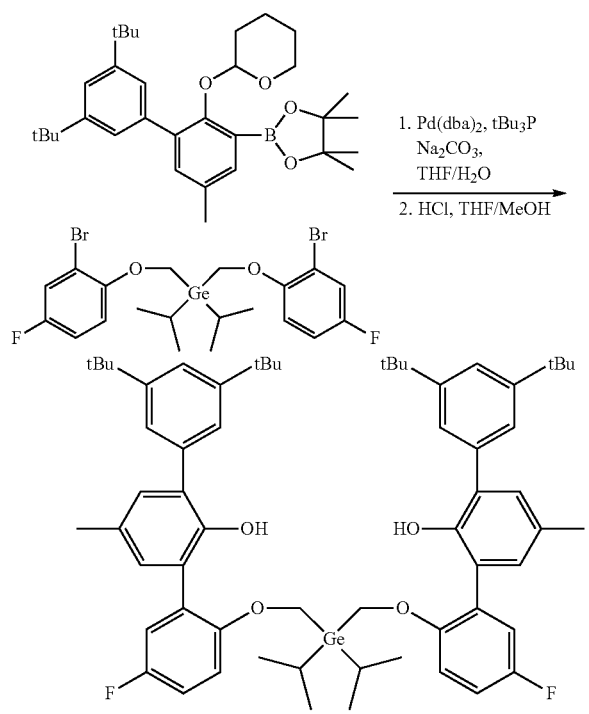

In a glovebox, to a 40 mL vial was added bis((2-bromo-4-fluorophenoxy)methyl)diisopropylgermane (1.7 g, 3.0 mmol, 1.0 equiv), 2-(3',5'-di-tert-butyl-5-methyl-2-((tetrahydro-2H-pyran-2-yl)oxy)-[1,1'-biphenyl]-3-yl)-4,4,5,5-tetramethyl-1,3,2-dioxaborolane (4.56 g, 9.0 mmol, 3.0 equiv), and degassed THF (12 mL). The vial was removed from the glovebox and water (6 mL) was added. Nitrogen was purged through the stirred solution for 5 min to ensure complete degassing. A pre-mixed solution of Pd(dba)$_2$ (0.069 g, 0.12 mmol, 0.04 equiv) and tBu$_3$P (0.049 g, 0.24 mmol, 0.08 equiv) in THF (2 mL) was added. The reaction was stirred vigorously at 70° C. for 18 hours. After cooling down to room temperature, the organic layer was transferred to a 100 mL round bottom flask, rinsed the vial with THF (4.0 mL). MeOH (15 mL) and concentrated HCl (1 mL) were added, and was then refluxed (80-90° C.) for 2 hours. The reaction mixture was concentrated by rotary-evaporation. Water (50 mL) was added and the product was extracted by ether (three times with 70 mL). The extract was dried over MgSO$_4$ and filtered through a plug of silica gel. After removing solvents, the residue was purified by C$_{18}$ reverse phase column chromatography. A yield of 2.335 g of a white solid was collection, providing 78% yield.

$^1$H NMR (400 MHz, CDCl$_3$) δ 7.44 (t, J=1.8 Hz, 2H), 7.30 (d, J=1.8 Hz, 4H), 7.10-7.06 (m, 2H), 7.01 (dd, J=8.8, 3.2 Hz, 2H), 6.91-6.88 (m, 2H), 6.85-6.78 (m, 2H), 6.67-6.62 (m, 2H), 5.35 (s, 2H), 3.77 (s, 4H), 2.29 (s, 6H), 1.34 (s, 36H), 1.20-1.09 (m, 2H), 0.79 (d, J=7.4 Hz, 12H). $^{19}$F{1H} NMR (376 MHz, CDCl$_3$) δ −123.74 (s, 2F).

Example 18

Preparation of Inventive Procatalyst 6

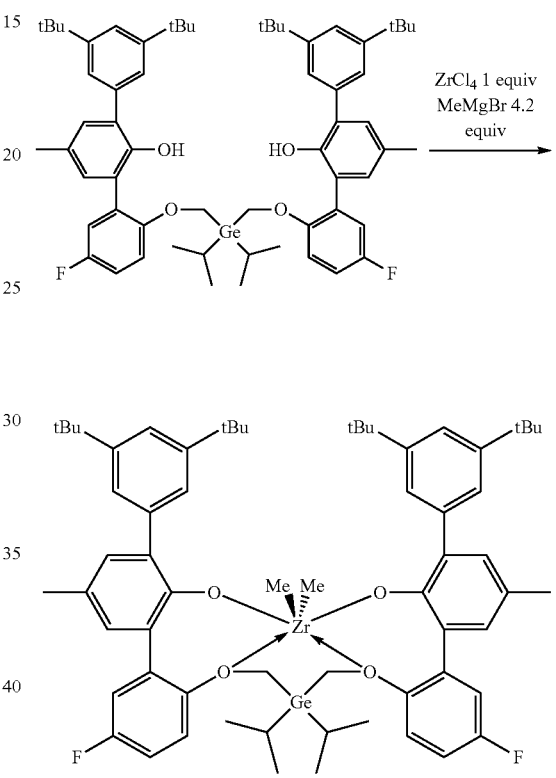

In a glovebox, an oven dried 100 mL bottle with a stir bar was charged with ZrCl$_4$ (0.466 g, 2.0 mmol, 1.0 equiv) and anhydrous DCM (50 mL). The vial was cooled to −30° C. in freezer for at least 30 minutes. The vial was removed from the freezer. MeMgBr in Et$_2$O (3 M, 2.8 mL, 8.4 mmol, 4.2 equiv) was added to the stirred suspension. After 2 minutes, 6",6""'-(((diisopropylgermanediyl)bis(methylene))bis(oxy))bis(3,5-di-tert-butyl-3"-fluoro-5'-methyl-[1,1':3',1"-terphenyl]-2'-ol) was added as solid. The resulting mixture was stirred at room temperature overnight. The reaction mixture was passed through a plug of CELITE™. The plug was washed with DCM (10 mL). Solvents were removed under vacuum to yield a dark solid which was washed with hexane (20 mL) and then extracted with toluene (40 mL). The toluene extract was dried under vacuum. A yield of 1.584 g of a light brown solid was collected, providing a 71% yield.

$^1$H NMR (400 MHz, C$_6$D$_6$) δ 8.07 (br s, 2H), 7.65 (t, J=1.8 Hz, 2H), 7.19 (d, J=2.4 Hz, 2H), 7.02 (dd, J=9.1, 3.1 Hz, 2H), 6.87-6.77 (m, 4H), 5.58-5.47 (m, 2H), 4.73 (d, J=11.7 Hz, 2H), 3.54 (d, J=11.6 Hz, 2H), 2.18 (s, 6H), 1.37 (s, 36H), 0.62-0.53 (m, 12H), 0.53-0.42 (m, 2H), 0.05 (s, 6H). $^{19}$F{1H} NMR (376 MHz, CDCl$_3$) δ −116.57 (m, 2F).

Example 19

Preparation of bis((2-bromo-4-(tert-butyl)phenoxy)methyl)diisopropylgermane

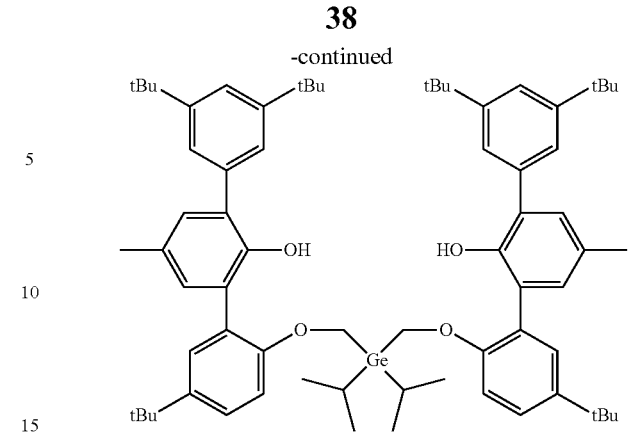

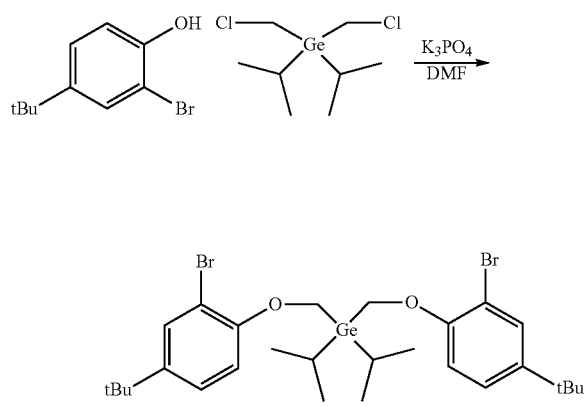

In a glovebox, a 40 mL vial was charged with bis(chloromethyl)diisopropylgermane (2.578 g, 10 mmol, 1.0 equiv), 2-bromo-4-(t-butyl)phenol (6.874 g, 30 mmol, 3.0 equiv), K$_3$PO$_4$ (8.49 g, 40 mmol, 4.0 equiv), and DMF (12 mL). The reaction mixture was stirred at 80° C. overnight and then at 100° C. for 2 hours. After cooling down to room temperature, the reaction mixture was poured into water (150 mL). The solution was extracted with ethyl acetate, washed twice with water, twice with 1 M KOH, and then with brine. The organic layer was dried over MgSO$_4$, filtered through a short plug of silica gel, and concentrated under pressure. The crude product was used for next step without purification. A yield of 5.15 g of a colorless oil was collected, providing a 80% yield.

$^1$H NMR (400 MHz, CDCl$_3$) δ 7.51 (d, J=2.4 Hz, 2H), 7.28-7.22 (m, 2H), 6.99 (d, J=8.7 Hz, 2H), 4.13 (s, 4H), 1.68 (p, J=7.5 Hz, 2H), 1.32-1.21 (m, 30H).

Example 20

Preparation of 6″,6″″-(((diisopropylgermanediyl)bis(methylene))bis(oxy))bis(3,3″,5-tri-tert-butyl-5′-methyl-[1,1′:3′,1″-terphenyl]-2′-ol)

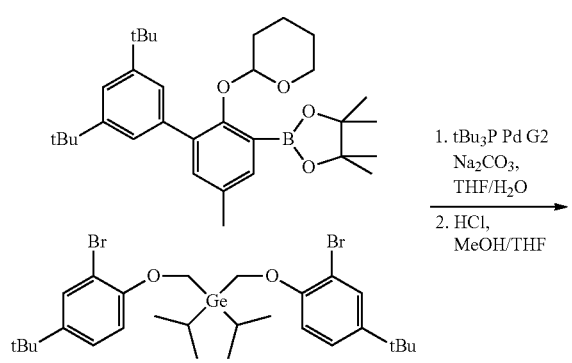

In a glovebox, a 40 mL vial was charged with bis((2-bromo-4-(tert-butyl)phenoxy)methyl)diisopropylgermane (1.93, 3.0 mmol, 1.0 equiv), 2-(3′,5′-di-tert-butyl-5-methyl-2-((tetrahydro-2H-pyran-2-yl)oxy)-[1,1′-biphenyl]-3-yl)-4,4,5,5-tetramethyl-1,3,2-dioxaborolane (3.8 g, 7.5 mmol, 2.5 equiv), Na$_2$CO$_3$ (1.91 g, 18 mmol, 6.0 equiv), degassed THF (4 mL), and degassed water (4 mL). A solution of tBu$_3$P Pd G2 (0.031 g, 0.06 mmol, 0.02 equiv) in THF (2 mL) was added. The reaction was stirred vigorously at 60° C. for 18 hours. After cooling down to room temperature, the organic layer was transferred to a 100 mL round bottom flask, rinsed the vial with THF (4 mL). MeOH (15 mL) and concentrated HCl (1.5 mL) were added, and was then refluxed (80-90° C.) for 2 hours. The reaction mixture was concentrated by rotary-evaporation. Water (50 mL) was added and the product was extracted by ether (70 mL×3). The extract was dried over MgSO$_4$ and filtered through a plug of silica gel. After removing solvents, the residue was purified by C$_{18}$ reverse phase column chromatography. A yield of 1.63 g of a white solid was collected, providing a 51% yield.

$^1$H NMR (400 MHz, CDCl$_3$) δ 7.39 (t, J=1.8 Hz, 2H), 7.36 (d, J=1.9 Hz, 4H), 7.29 (d, J=2.5 Hz, 2H), 7.23 (dd, J=8.7, 2.6 Hz, 2H), 7.10 (d, J=2.3 Hz, 2H), 6.94 (d, J=1.5 Hz, 1H), 6.77 (d, J=8.7 Hz, 2H), 5.43 (s, 2H), 3.81 (s, 4H), 2.32 (s, 6H), 1.33 (s, 36H), 1.30 (s, 18H), 1.20-1.10 (m, 2H), 0.80 (d, J=7.4 Hz, 12H).

Example 21

Preparation of Inventive Procatalyst 7

-continued

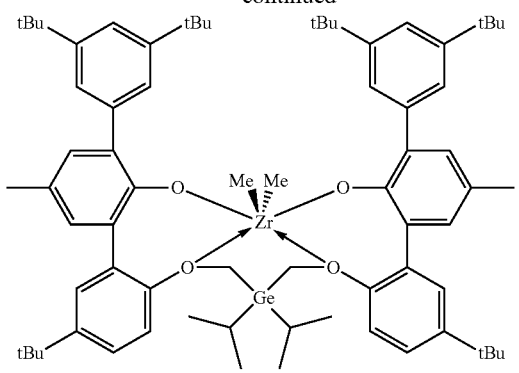

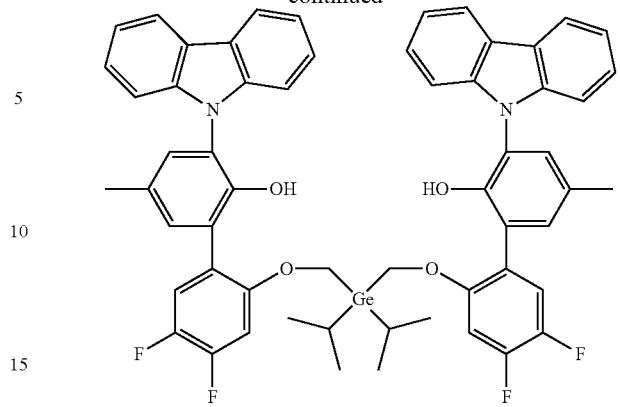

In a glovebox, an oven dried 100 mL bottle with a stir bar was suspended ZrCl$_4$ (0.354 g, 1.52 mmol, 1.0 equiv) in anhydrous toluene (40 mL). The bottle was cooled to −30° C. in freezer for at least 30 minutes then removed from the freezer. MeMgBr in Et$_2$O (3 M, 2.12 mL, 6.37 mmol, 4.2 equiv) was added to the stirred suspension. After 2 minutes, 6″,6″″-(((diisopropylgermanediyl)bis(methylene))bis(oxy)) bis(3,3″,5-tri-tert-butyl-5′-methyl-[1,1′:3′,1″-terphenyl]-2′-ol) (1.63 g, 1.52 mmol, 1.0 equiv) was added as solid. The resulting mixture was stirred at room temperature overnight. Solvents were removed under vacuum to yield a dark brown solid. The solid was washed with hexanes (20 mL), and was then extracted with toluene (50 mL). The toluene extract was dried under vacuum. A yield of 1.12 g of a light tan solid was collected, providing a 62% yield.

$^1$H NMR (400 MHz, CDCl$_3$) δ 7.79 (t, J=1.8 Hz, 2H), 7.55 (d, J=2.5 Hz, 2H), 7.28-7.18 (m, 5H), 7.08-6.98 (m, 3H), 5.68 (d, J=8.6 Hz, 2H), 4.81 (d, J=11.6 Hz, 2H), 3.67 (d, J=11.6 Hz, 2H), 2.26 (s, 6H), 1.46 (s, 36H), 1.25 (s, 18H), 0.67-0.52 (m, 14H), −0.05 (m, 6H).

Example 22

Preparation of 6′,6′″-(((diisopropylgermanediyl)bis (methylene))bis(oxy))bis(3-(9H-carbazol-9-yl)-3′,4′-difluoro-5-methyl-[1,1′-biphenyl]-2-ol)

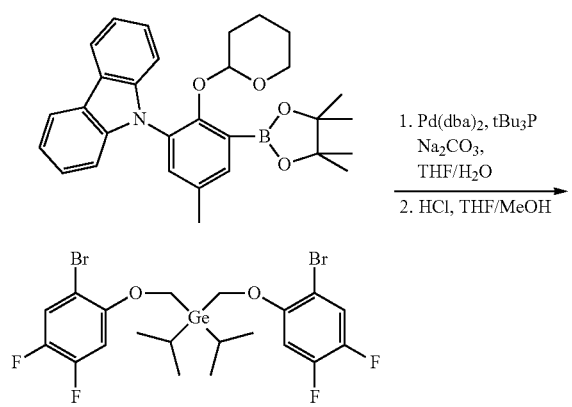

In a glovebox, a 40 mL vial was charged with bis((2-bromo-4,5-difluorophenoxy)methyl)diisopropylgermane (1.81 g, 3.0 mmol, 1.0 equiv), 9-(5-methyl-2-((tetrahydro-2H-pyran-2-yl)oxy)-3-(4,4,5,5-tetramethyl-1,3,2-dioxaborolan-2-yl)phenyl)-9H-carbazole (4.35 g, 9.0 mmol, 3.0 equiv), Na$_2$CO$_3$ (1.91 g, 18.0 mmol, 6.0 equiv) and degassed THF (14.0 mL). The vial was capped and removed from the glovebox and de-ionized water (7.0 mL) was added. Nitrogen was purged through the stirred reaction mixture for 5 min to ensure complete degassing. A pre-mixed solution of Pd(dba)$_2$ (0.069 g, 0.12 mmol, 0.04 equiv) and tBu$_3$P (0.049 g, 0.24 mmol, 0.08 equiv) in THF (2 mL) was added. The reaction was stirred vigorously at 70° C. for 18 hours. After cooling down to room temperature, the organic layer was transferred to a 100 mL round bottom flask, rinsed the vial with THF (4.0 mL). MeOH (15.0 mL) and concentrated HCl (1.5 mL) were added, and then was refluxed (80-90° C.) for 2 hours. The reaction mixture was concentrated by rotary-evaporation. Water (50 mL) was added and the product was extracted by ether (70 mL×3). The extract was dried over MgSO$_4$ and filtered through a plug of silica gel. After removing solvents, the residue was purified by crystallization in ether/methanol. A yield of 2.13 g of white solid was collected, providing a 72% yield.

$^1$H NMR (400 MHz, CDCl$_3$) δ 8.16 (d, J=7.7 Hz, 4H), 7.34-7.27 (m, 6H), 7.25-7.22 (m, 2H), 7.18 (d, J=2.3 Hz, 2H), 7.13-7.03 (m, 8H), 6.34-6.27 (m, 2H), 5.20 (s, 2H), 3.65 (s, 4H), 2.33 (s, 6H), 1.26-1.13 (m, 2H), 0.85 (d, J=7.4 Hz, 12H). $^{19}$F{1H} NMR (376 MHz, CDCl$_3$) δ −134.44 (d, J=22.5 Hz, 2F), −147.59 (d, J=22.5 Hz, 2F).

Example 23

Preparation of Inventive Procatalyst 8

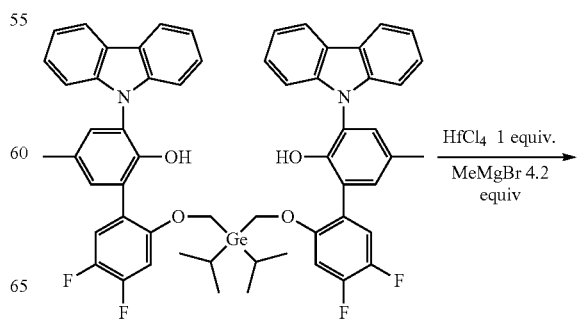

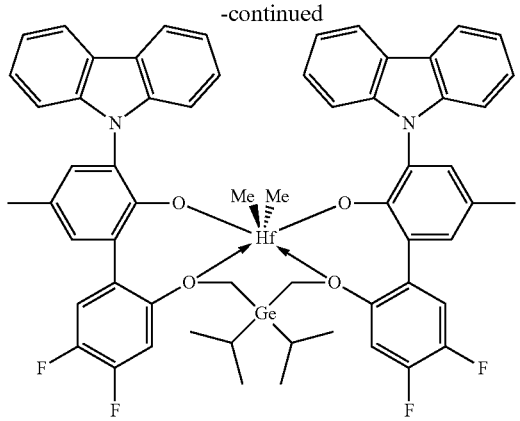

In a glovebox, an oven dried 100 mL bottle with a stir bar was suspended HfCl4 (0.641 g, 2.0 mmol, 1.0 equiv) in anhydrous DCM (50 mL). The bottle was cooled to −30° C. in freezer for at least 30 minutes then removed from the freezer. MeMgBr in Et$_2$O (3 M, 2.8 mL, 8.4 mmol, 4.2 equiv) was added to the stirring suspension. After 10 minutes, 6',6'''-(((diisopropylgermanediyl)bis(methylene))bis(oxy))bis(3-(9H-carbazol-9-yl)-3',4'-difluoro-5-methyl-[1,1'-biphenyl]-2-ol) (1.976 g, 2.0 mmol, 1.0 equiv) was added as solid. The resulting mixture was stirred at room temperature overnight. The reaction mixture was passed through a plug of CELITE™. The plug was washed with DCM (10 mL). Solvent was removed under vacuum to yield a dark brown solid. The solid was washed with hexanes (20 mL), and was then extracted with toluene (50 mL). The toluene extract was dried under vacuum. A 2.094 g yield of a light tan solid was collected, providing 88% yield.

$^1$H NMR (400 MHz, CDCl$_3$) δ 8.44-8.38 (m, 2H), 8.19-8.14 (m, 2H), 7.50-7.33 (m, 8H), 7.30-7.23 (m, 2H), 7.04-6.97 (m, 4H), 6.71-6.61 (m, 4H), 5.03-4.93 (m, 2H), 4.31 (d, J=12.1 Hz, 2H), 3.23 (d, J=12.1 Hz, 2H), 2.05 (s, 6H), 0.58-0.43 (m, 14H), −1.04 (s, 6H). $^{19}$F{1H} NMR (376 MHz, C$_6$D$_6$) δ −134.02 (d, J=22.6 Hz, 2F), −140.54 (d, J=22.6 Hz, 2F).

Example 24

Preparation of 2-(3',5'-di-t-butyl-5-octyl-2-((tetrahydro-2H-pyran-2-yl)oxy)-[1,1'-biphenyl]-3-yl)-4,4,5,5-tetramethyl-1,3,2-dioxaborolane

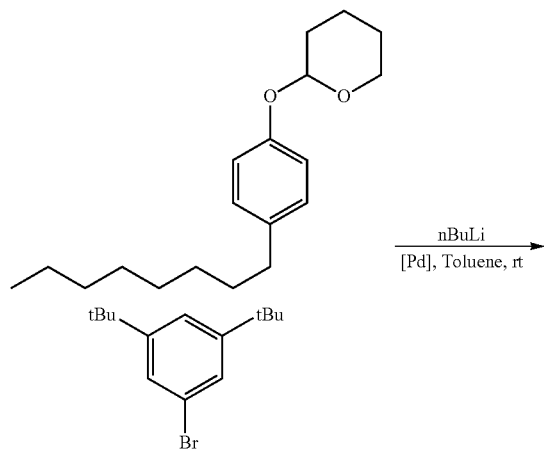

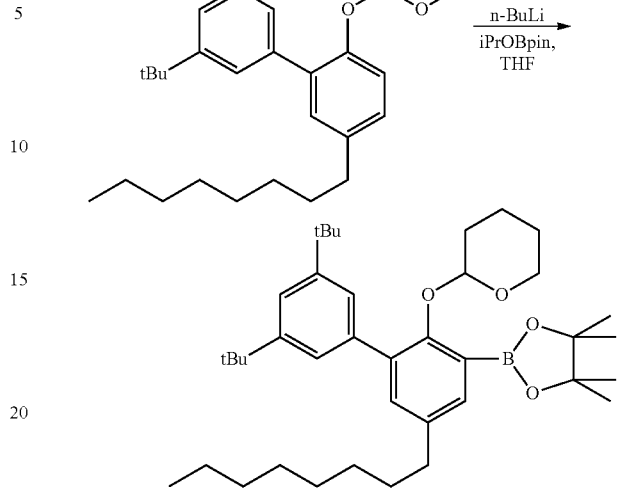

Preparation of PhLi solution: In a glovebox, a dry 40 mL vial was charged with 2-(4-octylphenoxy)tetrahydro-2H-pyran (2.906 mL, 10.0 mmol, 1.0 equiv) and dry THF (10 mL) and the solution was cooled down to −30° C. in a freezer for 30 minutes. After removing from the freezer, n-BuLi in hexanes (2.5 M, 4.8 mL, 12.0 mmol, 1.2 equiv) was added slowly to the cooled solution. The reaction mixture was stirred at room temperature for 2 hours.

Cross-coupling reaction: In a glovebox, a 250 mL round bottom flask was charged with 1-bromo-3,5-di-tertiary-butylbenzene (2.694 mL, 10.0 mmol, 1.0 equiv), tBu$_3$P Pd G2 (Buchwald second generation pre-catalyst, 154 mg, 0.30 mmol, 0.03 equiv), and toluene (40 mL). The round bottom flask was capped, sealed, and removed from the glovebox and the PhLi (phenyllithium) solution prepared above was added slowly by a syringe pump at room temperature over 90 minutes. The reaction was quenched with MeOH. Solvents were evaporated and the product was purified by silica gel column chromatography. Collected 3.67 g of a colorless solid, 77% yield.

Borylation: In a glovebox, a dried 40 mL vial was charged with 2-((3',5'-di-t-butyl-5-octyl-[1,1'-biphenyl]-2-yl)oxy)tetrahydro-2H-pyran (3.67 mL, 7.67 mmol, 1.0 equiv) prepared above and THF (30 mL) and subsequently cooled to −30° C. in a freezer. After removing from the freezer, n-BuLi in hexanes (2.5 M, 4.3 mL, 10.7 mmol, 1.4 equiv) was added dropwise to the cooled solution, the reaction mixture was stirred at room temperature for 3 hours. Bis(pinacolato)diboron (iPrOBpin) (2.35 mL, 11.5 mmol, 1.5 equiv) was then added in one portion and the resulting mixture was stirred overnight. Water (3 mL) was added to the reaction and solvents were removed by rotary evaporation. The residue was dissolved in DCM (150 mL) and washed several times with brine. After drying with MgSO$_4$ and filtration, the product was obtained by removal of solvent. The crude product was used without further purification, providing 4.27 g of a colorless solid, a 92% yield.

$^1$H NMR (400 MHz, CDCl$_3$) δ 7.52 (d, J=2.4 Hz, 1H), 7.38 (d, J=1.9 Hz, 2H), 7.35 (t, J=1.8 Hz, 1H), 7.23 (d, J=2.4 Hz, 1H), 4.99 (t, J=3.1 Hz, 1H), 2.93-2.86 (m, 1H), 2.69-2.61 (m, 1H), 2.61-2.55 (m, 2H), 1.79-1.56 (m, 4H), 1.44-1.09 (m, 44H), 0.91-0.82 (m, 3H).

Example 25

Preparation of 6'',6''''-(((diisopropylgermanediyl)bis(methylene))bis(oxy))bis(3,3'',5-tri-t-butyl-5'-octyl-[1,1':3',1''-terphenyl]-2'-ol)

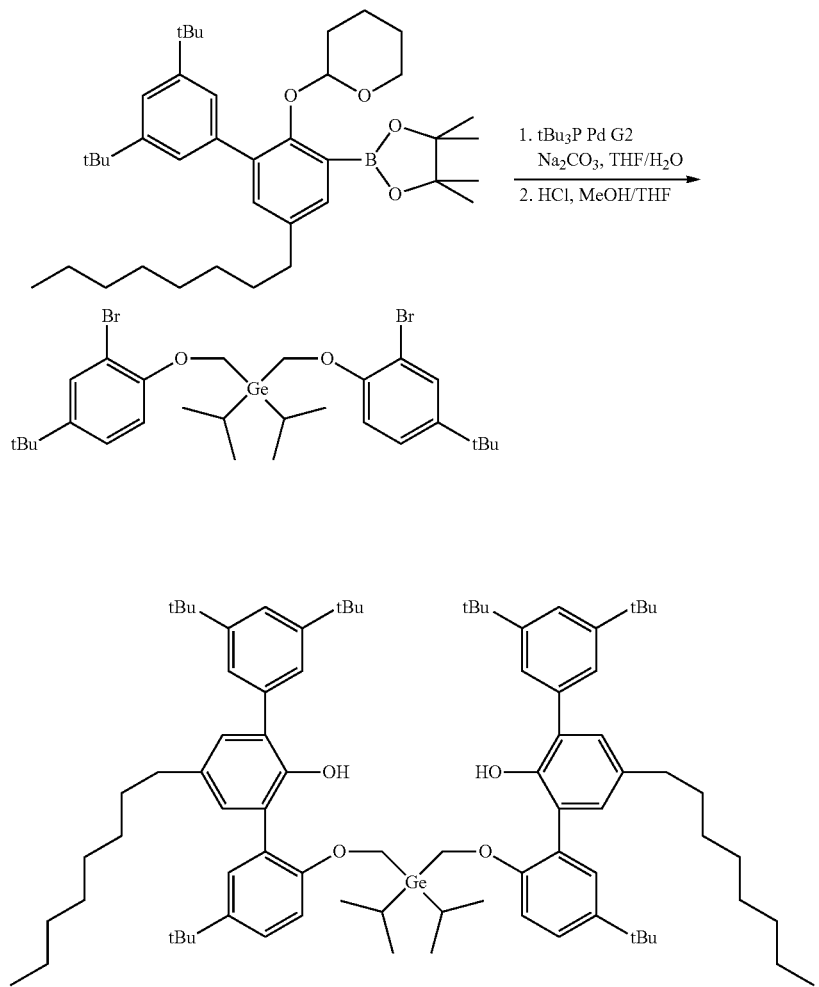

In a glovebox, a 40 mL vial was charged with 2-(3',5'-di-t-butyl-5-octyl-2-((tetrahydro-2H-pyran-2-yl)oxy)-[1,1'-biphenyl]-3-yl)-4,4,5,5-tetramethyl-1,3,2-dioxaborolane (2.116 g, 3.5 mmol, 2.5 equiv), bis((2-bromo-4-(t-butyl)phenoxy)methyl)diisopropylgermane (0.9 g, 1.4 mmol, 1.0 equiv), Na$_2$CO$_3$ (0.89 g, 8.4 mmol, 6.0 equiv), degassed THF (5 mL), and degassed water (5 mL). A solution of tBu$_3$P Pd G2 (0.022 g, 0.042 mmol, 0.03 equiv) in THF (2 mL) was added. The reaction was heated under nitrogen at 60° C. overnight. When completed, the top organic layer was transferred to a 100 mL round bottom flask, and the bottom aqueous layer was washed with THF (10 mL). A solution of methanol (15 mL) and concentrated HCl (1 mL) were then added to the flask. The reaction mixture was refluxed at 85° C. for 2 hours. Solvents were removed under reduced pressure. The residue was dissolved in ether, washed with water, dried over MgSO$_4$, filtered through a plug of silica gel, and then concentrated. The residue was purified by C$_{18}$ reverse phase column chromatography.

$^1$H NMR (400 MHz, C$_6$D$_6$) δ 7.42-7.35 (m, 6H), 7.30 (d, J=2.5 Hz, 2H), 7.21 (dd, J=8.6, 2.5 Hz, 2H), 7.11 (d, J=2.3 Hz, 2H), 6.95 (d, J=2.3 Hz, 2H), 6.72 (d, J=8.6 Hz, 2H), 5.43 (s, 2H), 3.81 (br s, 4H), 2.58 (t, J=7.8 Hz, 4H), 1.66-1.56 (m, 4H), 1.38-1.22 (m, 74H), 1.17-1.08 (m, 2H), 0.90-0.84 (m, 6H), 0.76 (d, J=7.4 Hz, 12H).

Example 26

Preparation of Procatalyst 9

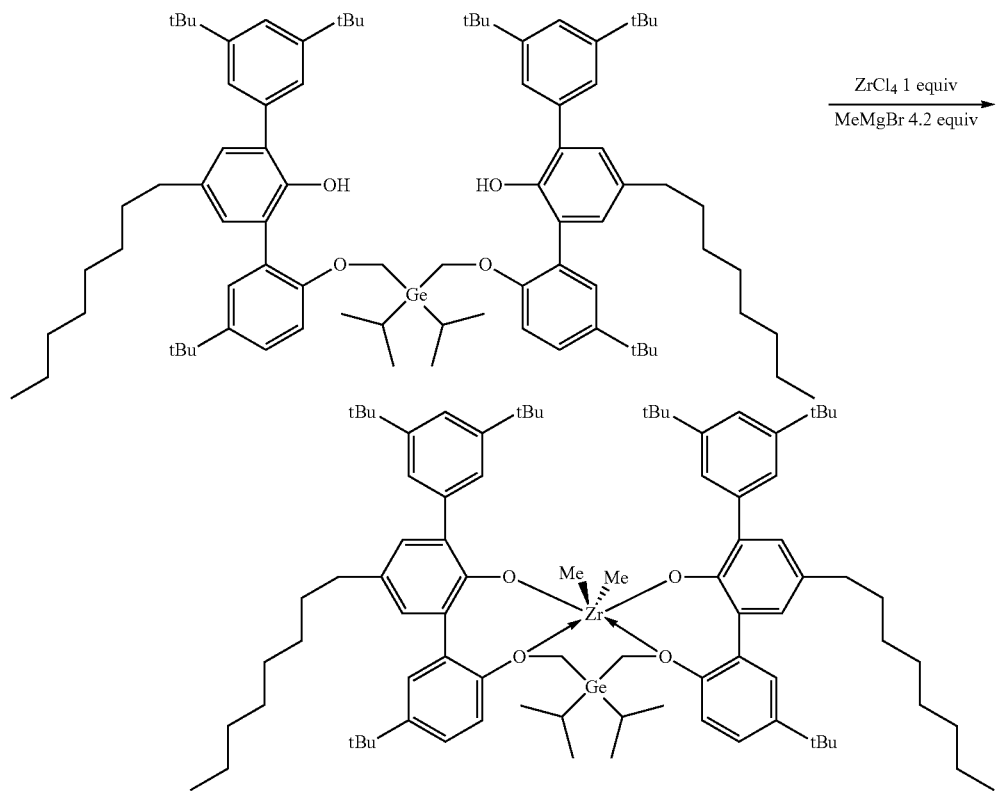

In a glovebox, a 100 mL bottle was charged with a stir bar, ZrCl$_4$ (0.233 g, 1.0 mmol, 1.0 equiv), and toluene (30 mL). The mixture was cooled to −30° C. in a freezer for 30 minutes. After removing from the freezer, MeMgBr in Et$_2$O (3.0 M, 1.4 mL, 4.2 mmol, 4.2 equiv) was added. The mixture was stirred vigorously. After 2 minutes, 6″,6″″- (((diisopropylgermanediyl)bis(methylene))bis(oxy))bis(3, 3″,5-tri-t-butyl-5′-octyl-[1,1′:3′,1″-terphenyl]-2′-ol) (1.271 g, 1.0 mmol, 1.0 equiv) was added as solid. The ligand container was rinsed with additional toluene (4 mL). The resulting mixture was stirred at room temperature overnight. Solvents were removed under vacuum to yield a dark brown solid which was extracted with hexanes (60 mL) and then with toluene (15 mL). The hexane extract was concentrated to about 3-4 mL and then kept in a freezer for one day. The top solution was decanted and the white solid was dried under vacuum yielding a white solid (645 mg). The toluene extract was dried under vacuum to afford a white solid (460 mg), providing a 79% combined yield.

$^1$H NMR (400 MHz, C6D6) δ 8.14 (br s, 2H), 7.80 (t, J=1.9 Hz, 2H), 7.59 (d, J=2.5 Hz, 2H), 7.36 (d, J=2.4 Hz, 2H), 7.31 (d, J=2.4 Hz, 2H), 7.20 (dd, J=8.6, 2.5 Hz, 2H), 5.70 (d, J=8.6 Hz, 2H), 4.86 (d, J=11.5 Hz, 2H), 3.71 (d, J=11.5 Hz, 2H), 2.71-2.55 (m, 4H), 1.70-1.22 (m, 80H), 0.95-0.88 (m, 6H), 0.70-0.61 (m, 12H), −0.03 (s, 6H).

Procedure for Batch Reactor Polymerization

Raw materials (ethylene, 1-octene) and the process solvent (a narrow boiling range high-purity isoparaffinic solvent trademarked ISOPAR E commercially available from ExxonMobil Corporation) were purified with molecular sieves before introduction into the reaction environment. A one gallon (3.79 L) stirred autoclave reactor was charged with ISOPAR E, and 1-octene. The reactor was then heated to the desired temperature and charged with ethylene to bring the total pressure to ca 420 psig. The catalyst composition was prepared in a drybox under inert atmosphere by mixing the desired metal-ligand complex and a co-catalyst ([HNMe(C$_{18}$H$_{37}$)$_2$][B(C$_6$F$_5$)$_4$] along with modified methylaluminoxane (MMAO), with additional solvent to give a total volume of about 15-20 mL. The activated catalyst mixture was then quick-injected into the reactor. The reactor pressure and temperature were kept constant by feeding ethylene during the polymerization and cooling the reactor as needed. After 10 minutes, the ethylene feed was shut off and the solution transferred into a nitrogen-purged resin kettle. The polymer was thoroughly dried in a vacuum oven, and the reactor was thoroughly rinsed with hot ISOPAR E between polymerization runs.

Procedure for Miniplant Polymerization

Raw materials (ethylene, 1-octene) and the process solvent (a narrow boiling range high-purity isoparaffinic solvent trademarked Isopar E commercially available from ExxonMobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to above reaction pressure at 525 psig. The solvent and comonomer (1-octene) feed is pressurized via mechanical positive displacement pump to above reaction pressure at 525 psig. MMAO, commercially available from AkzoNobel, was used as an impurity scavenger. The individual catalyst components (procatalyst or cocatalyst) were manually batch diluted to specified component concentrations with purified solvent (Isopar E) and pressured to above reaction pressure at 525 psig. The cocatalyst is [HNMe(C$_{18}$H$_{37}$)$_2$][B(C$_6$F$_5$)$_4$], commercially available from Boulder Scientific, and was used at a 1.2 molar ratio relative to the metal-ligand complex of formula (I). All reaction feed flows were measured with mass flow meters and independently controlled with computer automated valve control systems.

The continuous solution polymerizations were carried out in a 5 liter (L) continuously stirred-tank reactor (CSTR). The reactor has independent control of all fresh solvent, monomer, comonomer, hydrogen, and catalyst component feeds. The combined solvent, monomer, comonomer and hydrogen feed to the reactor is temperature controlled to anywhere between 5° C. to 50° C. and typically 25° C. The fresh comonomer feed to the polymerization reactor is fed in with the solvent feed. The fresh solvent feed is controlled typically with each injector receiving half of the total fresh feed mass flow. The cocatalyst is fed based on a calculated specified molar ratio (1.2 molar equivalents) to the metal-ligand complex of formula (I). Immediately following each fresh injection location, the feed streams are mixed with the circulating polymerization reactor contents with static mixing elements. The effluent from the polymerization reactor (containing solvent, monomer, comonomer, hydrogen, catalyst components, and molten polymer) exits the first reactor loop and passes through a control valve (responsible for maintaining the pressure of the first reactor at a specified target). As the stream exits the reactor it is contacted with water to stop the reaction. In addition, various additives, such as antioxidants, could be added at this point. The stream then went through another set of static mixing elements to evenly disperse the catalyst kill and additives.

Following additive addition, the effluent (containing solvent, monomer, comonomer, hydrogen, catalyst components, and molten polymer) passed through a heat exchanger to raise the stream temperature in preparation for separation of the polymer from the other lower boiling reaction components. The stream then entered a two stage separation and devolatization system where the polymer was removed from the solvent, hydrogen, and unreacted monomer and comonomer. The separated and devolatized polymer melt was pumped through a die specially designed for underwater pelletization, cut into uniform solid pellets, dried, and transferred into a box for storage.

Catalyst efficiency and resulting polymer characteristics were assessed for Procatalysts 1-9, each having a structure according to formula (I) with a germanium bridge, and for Comparative Procatalysts C1-C4, each of which includes a silicon bridge or an alkyl bridge instead of a germanium bridge. The Comparative Procatalysts C1-C4 had the following structures:

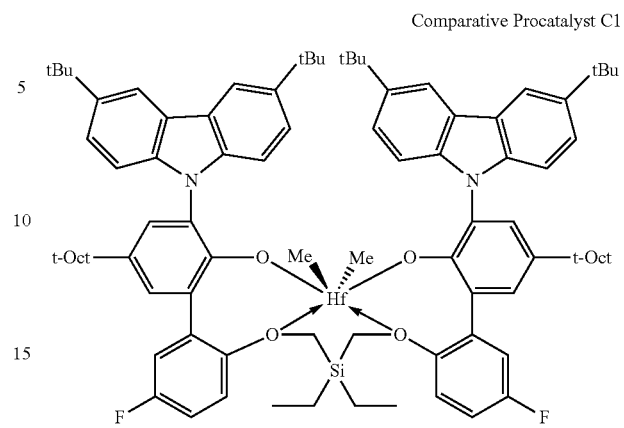

Comparative Procatalyst C1

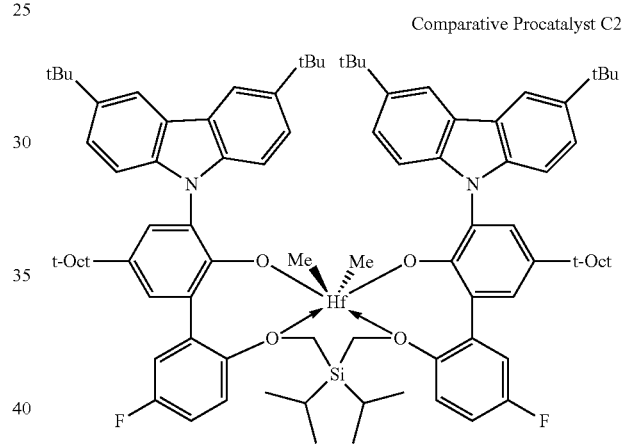

Comparative Procatalyst C2

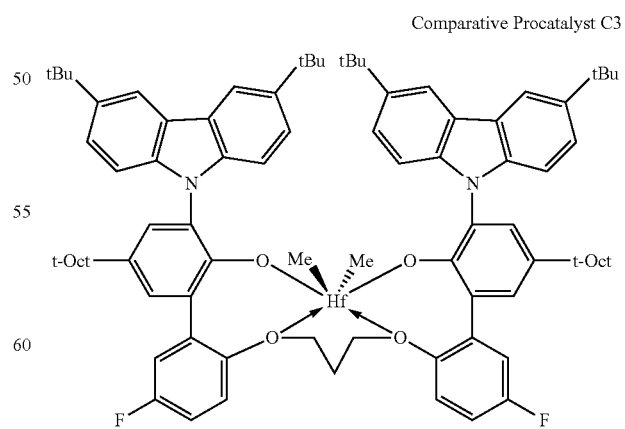

Comparative Procatalyst C3

Comparative Procatalyst C4

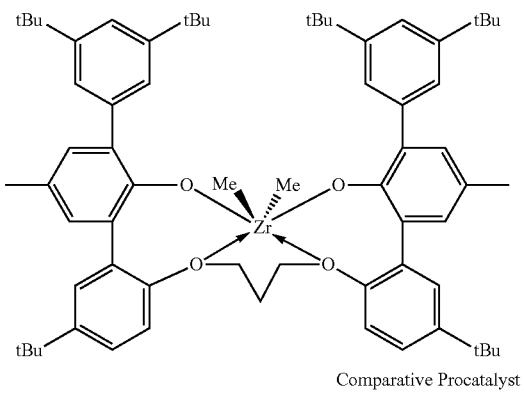

Comparative Procatalyst C5

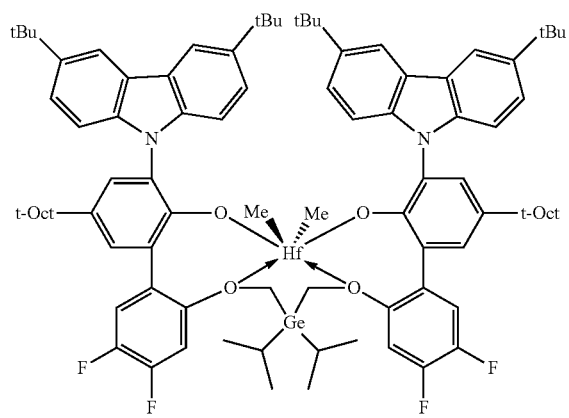

Comparative Procatalyst C6

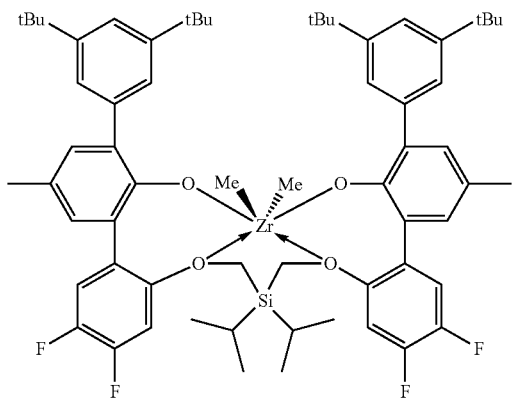

Comparative Procatalyst C2 differed from Procatalyst 2 in that the Si in C2 was replaced by Ge. Comparative Procatalyst C3 differed from Procatalyst 2 in that the non-branching alkyl bridge was replaced by a branching Ge bridge. C1 differed from Procatalyst 1 in that the Si was replaced with a Ge, and C4 differed from Procatalyst 7 in that the alkyl bridge was replaced with an iso-propyl substituted Ge bridge. These differences affected the polymerization results in that the yielded polymers exhibited varying results as shown in Tables 1 and 2 and discussed in the proceeding paragraphs.

Procatalysts 1-9 and Comparative Procatalysts C1-C4 were individually reacted using the polymerization conditions in a single reactor system, as previously described. Properties for the resulting polymers are reported in Table 1 and Table 2.

TABLE 1

Batch Reactor Polymerization Data

| Procatalyst | Eff* | $T_m$ (° C.) | Density (g/mL) | MWD | Mw (g/mol) | Mw reduction at 40 mmol $H_2$ |
|---|---|---|---|---|---|---|
| Procatalyst 1 | 280,000 | 92.3 | 0.8924 | 2.30 | 840,890 | 42% |
| Procatalyst 2 | 330,000 | 92.4 | 0.8928 | 1.98 | 1,231,694 | 56% |
| Procatalyst 3 | 330,000 | 84.2 | 0.8881 | 2.27 | 1,141,988 | 56% |
| Procatalyst 4 | 3,720,000 | 87.5 | 0.8871 | 2.35 | 993,997 | 54% |
| Procatalyst 5 | 500,000 | 90.4 | 0.8937 | 2.17 | 1,064,021 | 86% |
| Procatalyst 6 | 1,160,000 | 99.3 | 0.8972 | 2.32 | 891,110 | 71% |
| Procatalyst 7 | 1,840,000 | 98.6 | 0.8822 | 2.39 | 1,156,226 | 74% |
| Procatalyst 8 | 1,010,000 | 80.8 | 0.8866 | 2.18 | 688,900 | 46% |
| Procatalyst 9 | 1,210,000 | 100.4 | 0.8981 | 2.21 | 1,118,831 | 78% |
| Procatalyst C1 (comparative) | 190,000 | 90.0 | 0.8926 | 2.62 | 618,390 | 36% |
| Procatalyst C2 (comparative) | 280,000 | 86.8 | 0.8900 | 1.98 | 782,227 | 34% |
| Procatalyst C3 (comparative) | 130,000 | 94.0 | 0.8960 | 1.86 | 448,322 | 11% |
| Procatalyst C4 (comparative) | 880,000 | 106.0 | 0.8990 | 1.97 | 439,567 | — |
| Procatalyst C5 (comparative) | 140,000 | 79.5 | 0.8865 | 2.51 | 801,420 | 53% |
| Procatalyst C6 (comparative) | 220,000 | 87.0 | 0.8898 | 2.02 | 740,660 | 81% |

Polymerization conditions: 1.47 Kg Isopar-E; 100 g octene; 100 g ethylene; temperature was 160° C.; total pressure was 410 psi; procatalyst:activator ratio was 1:1.2; activator was [HNMe($C_{18}H_{37}$)$_2$][B($C_6F_5$)$_4$]; MMAO was used as an impurity scavenger at a 50:1 molar ratio (Al:procatalyst); reaction time was 10 min.
*Efficiency (Eff) in units of grams of polymer per gram of active metal (Zr or Hf) in the catalyst.

TABLE 2

Miniplant polymerization data

| Procatalyst | Temp °C. | Eff* | $I_2$ (g/ 10 min) | $H_2$ (mol %) | $I_{10}/I_2$ | C8/ olefin | Density (g/mL) |
|---|---|---|---|---|---|---|---|
| Procatalyst 3 | 165 | 3.37 | 0.28 | 0.57 | 7.04 | 33.8 | 0.8941 |
| Procatalyst 4 | 150 | 3.25 | 0.33 | 0.55 | 6.73 | 33.8 | 0.8914 |
| Procatalyst 5 | 165 | 0.72 | 0.32 | 0.13 | 7.66 | 33.6 | 0.8948 |
| Procatalyst 6 | 165 | 1.15 | 0.29 | 0.12 | 7.17 | 42.0 | 0.8931 |
| Procatalyst 7 | 165 | 2.59 | 0.35 | 0.16 | 5.46 | 42.0 | 0.8952 |
| Procatalyst 8 | 165 | 3.11 | 0.24 | 0.41 | 8.25 | 33.9 | 0.8902 |
| Procatalyst 9 | 165 | 1.70 | 0.30 | 0.28 | 6.10 | 29.6 | 0.9025 |
| Procatalyst C1 (comparative) | 150 | 6.8 | 0.37 | 0.91 | 8.06 | 37.0 | 0.8967 |
| Procatalyst C2 (comparative) | 165 | 4.28 | 0.25 | 0.64 | 7.40 | 33.8 | 0.8945 |
| Procatalyst C4 (comparative) | 150 | 3.8 | 0.30 | 0.23 | 7.10 | 51.0 | 0.8963 |
| Procatalyst C5 (comparative) | 165 | 1.25 | 0.34 | 0.92 | 7.21 | 41.5 | 0.8887 |

*Efficiency is defined in units of $10^6$ grams polymer per gram of active metal (Hf or Zr).
**C8/olefin is defined as: (moles 1-octene/(total moles 1-octene and ethylene)) × 100.
***$H_2$ (mol %) is defined as: the mole fraction of hydrogen, relative to ethylene, fed into the reactor.

Polymers prepared in polymerization systems including Procatalysts 1-9, each having a germanium bridge, had consistently higher molecular weights than the polymers from the polymerization systems that include Comparative Procatalysts C1-C4, each having either a silyl bridge or an alkyl bridge. Procatalyst 2, having two iso-propyl groups bonded to the germanium and a 3,6-di-tert-butylcarbazol-9-yl, created a polymer with the largest molecular weight (Mw) and one of the lowest molecular weight distributions (MWD).

Thus, the catalyst systems incorporating metal-ligand complexes with germanium bridges yielded polymers having larger molecular weights than those of polymers prepared using the comparative catalysts having alkyl or silyl bridges. As mentioned in the preceding paragraph, the polymer created by Procatalyst 2 had the largest molecular weight. Comparatively, the molecular weight of the polymer prepared using Procatalyst 2 was about three times greater than that of the polymer prepared using Comparative Procatalyst C3 and almost double that of the polymer prepared using Comparative Procatalyst C2. Similarly, the molecular weight of the polymer prepared using Procatalyst 7 was nearly three times greater than the molecular weight of the polymer prepared using Comparative Procatalyst C4.

In addition to the germanium-bridged procatalysts producing polymers that overall tend to have a larger molecular weight, the procatalysts that had zirconium as the metal center provided excellent sensitivity to hydrogen while yielding polymers with other good properties, such as high molecular weight, low molecular weight distribution, and low melt flow ratio ($I_{10}/I_2$). Procatalysts 5-7 yielded polymers with between 71% and 86% MW reduction when run in the presence of 40 mmol of hydrogen, while the hafnium analogues yielded polymers with between 11% and 56% MW reduction. Additionally, Procatalysts 5-7 were more sensitive to hydrogen than the Comparative Procatalysts. The systems incorporating these procatalysts required less hydrogen in the miniplant reactor to control the molecular weight of the polymer. The systems including the procatalysts with lower sensitivity required more hydrogen in the reactor.

Measurement Standards

Density

Samples that were measured for density were prepared according to ASTM D-1928, which is incorporated herein by reference in its entirety. Measurements were made within one hour of sample pressing using ASTM D-792, Method B, which is incorporated herein by reference in its entirety.

Melt Index

Melt index ($I_2$) was measured in accordance with ASTM-D 1238, which is incorporated herein by reference in its entirety, Condition 190° C./2.16 kg, and was reported in grams eluted per 10 minutes. Melt flow rate ($I_{10}$) was measured in accordance with ASTM-D 1238, Condition 190° C./10 kg, and was reported in grams eluted per 10 minutes.

Gel Permeation Chromatography (GPC)

The ethylene/alpha-olefin interpolymers were tested for their properties via GPC, according to the following procedure. The GPC system consists of a Waters (Milford, Mass.) 150° C. high temperature chromatograph (other suitable high temperatures GPC instruments include Polymer Laboratories (Shropshire, UK) Model 210 and Model 220) equipped with an on-board differential refractometer (RI). Additional detectors could include an IR4 infra-red detector from Polymer ChAR (Valencia, Spain), Precision Detectors (Amherst, Mass.) 2-angle laser light scattering detector Model 2040, and a Viscotek (Houston, Tex.) 150R 4-capillary solution viscometer. A GPC with the last two independent detectors and at least one of the first detectors was sometimes referred to as "3D-GPC", while the term "GPC" alone generally referred to conventional GPC. Depending on the sample, either the 15-degree angle or the 90-degree angle of the light scattering detector was used for calculation purposes.

Data collection was performed using Viscotek TriSEC software, Version 3, and a 4-channel Viscotek Data Manager DM400. The system was equipped with an on-line solvent degassing device from Polymer Laboratories (Shropshire, UK). Suitable high temperature GPC columns could be used such as four 30 cm long Shodex HT803 13 micron columns or four 30 cm Polymer Labs columns of 20-micron mixed-pore-size packing (MixA LS, Polymer Labs). The sample carousel compartment was operated at 140° C. and the column compartment was operated at 150° C. The samples were prepared at a concentration of 0.1 grams of polymer in 50 milliliters of solvent. The chromatographic solvent and the sample preparation solvent contain 200 ppm of butylated hydroxytoluene (BHT). Both solvents were sparged with nitrogen. The polyethylene samples were gently stirred at 160° C. for four hours (4 h). The injection volume was 200 microliters (µL). The flow rate through the GPC was set at 1 mL/minute.

The GPC column set was calibrated before running the Examples by running twenty-one narrow molecular weight distribution polystyrene standards. The molecular weight (Mw) of the standards ranges from 580 to 8,400,000 grams per mole (g/mol), and the standards were contained in 6 "cocktail" mixtures. Each standard mixture had at least a decade of separation between individual molecular weights. The standard mixtures were purchased from Polymer Laboratories (Shropshire, UK). The polystyrene standards were prepared at 0.025 g in 50 mL of solvent for molecular weights equal to or greater than 1,000,000 g/mol and 0.05 g in 50 mL of solvent for molecular weights less than 1,000,000 g/mol. The polystyrene standards were dissolved at 80° C. with gentle agitation for 30 minutes. The narrow standards mixtures were run first and in order of decreasing highest molecular weight (Mw) component to minimize degradation. The polystyrene standard peak molecular weights were converted to polyethylene Mw using the Mark-Houwink constants. Upon obtaining the constants, the two values were used to construct two linear reference conventional calibrations for polyethylene molecular weight and polyethylene intrinsic viscosity as a function of elution column.

Measurement for Efficiency

The catalytic efficiency was measured in terms of amount of polymer produced relative to the amount catalyst used in solution polymerization process.

It should be apparent to those skilled in the art that various modifications can be made to the described embodiments without departing from the spirit and scope of the claimed subject matter. Thus, it is intended that the specification cover modifications and variations of the described embodiments provided such modification and variations come within the scope of the appended claims and their equivalences.

The invention claimed is:

1. A catalyst system comprising a metal-ligand complex according to formula (I):

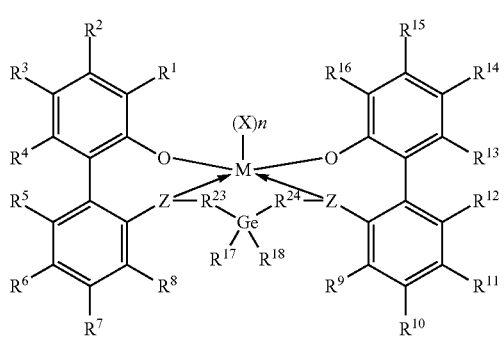

where:
M is a metal chosen from titanium, zirconium, or hafnium, the metal being in a formal oxidation state of +2, +3, or +4;
n is 0, 1, or 2;
when n is 1, X is a monodentate ligand or a bidentate ligand;
when n is 2, each X is an independently chosen monodentate ligand;
the metal-ligand complex is overall charge-neutral;
each Z is independently chosen from —O—, —S—, —N($R^N$)—, or —P($R^P$)—;
$R^1$ and $R^{16}$ are independently selected from the group consisting of —H, ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —OR$^C$, —SR$^C$, —NO$_2$, —CN, —CF$_3$, $R^C$S(O)$_2$, $R^C$S(O)$_2$, ($R^C$)$_2$C=N—, $R^C$C(O)O—, $R^C$OC(O)—, ($R^C$)$_2$NC(O)—, halogen, radicals having formula (II), radicals having formula (III), and radicals having formula (IV):

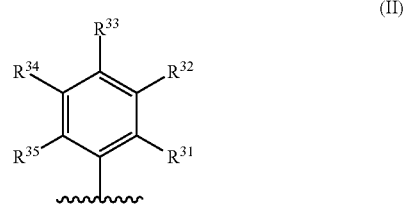

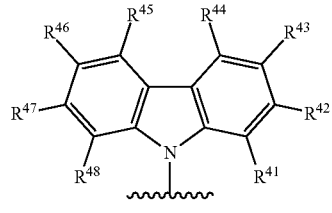

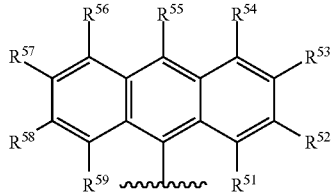

where each of $R^{31-35}$, $R^{41-48}$, and $R^{51-59}$ is independently chosen from ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —N=CHR$^C$, —OR$^C$, —SR$^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^C$)$_2$NC(O)—, halogen, or —H,
provided at least one of $R^1$ or $R^{16}$ is a radical having formula (II), a radical having formula (III), or a radical having formula (IV);
each of $R^{2-4}$, $R^{5-8}$, $R^{9-12}$, and $R^{13-15}$ is independently selected from ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —N=CHR$^C$, —OR$^C$, —SR$^C$, —NO$_2$, —CN, —CF$_3$, $R^C$S(O)—, $R^C$S(O)$_2$—, ($R^C$)$_2$C=N, $R^C$C(O)O—, $R^C$OC(O)—, $R^C$C(O)N(R)—, ($R^C$)$_2$NC(O)—, halogen, and —H;
$R^{17}$ and $R^{18}$ are independently ($C_2$-$C_{40}$)hydrocarbyl, provided that when both $R^{17}$ and $R^{18}$ are ethyl, not more than two of $R^{5-7}$ are fluorine or not more than two $R^{10-12}$ are fluorine; optionally $R^{17}$ and $R^{18}$ are joined together to form a ($C_3$-$C_{50}$)hydrocarbylene;
$R^{23}$ and $R^{24}$ are independently selected from —(CR$^C_2$)$_m$—, where m is 1 or 2;
each $R^C$, $R^P$, and $R^N$ in formula (I) is independently a ($C_1$-$C_{30}$)hydrocarbyl, ($C_1$-$C_{30}$)heterohydrocarbyl, or —H.

2. The catalyst system according to claim 1, wherein:
M is zirconium or hafnium; each Z is oxygen; and
$R^1$ and $R^{16}$ are identical and are selected from the group consisting of radicals having formula (II), radicals having formula (III), and radicals having formula (IV).

3. The catalyst system according to claim 1, wherein at least one of $R^1$ and $R^{16}$ is a radical having formula (III), where at least one of $R^{43}$ or $R^{46}$ is tert-butyl and where $R^{41-42}$, $R^{44-45}$, and $R^{47-48}$ are —H.

4. The catalyst system according to claim 1, wherein at least one of $R^1$ and $R^{16}$ is a radical having formula (III), where at least one of $R^{42}$ or $R^{47}$ is tert-butyl and where $R^{41}$, $R^{43-46}$, and $R^{48}$ are —H.

5. The catalyst system according to claim 1, wherein at least one of $R^1$ and $R^{16}$ is a radical having formula (II), where $R^{32}$ and $R^{34}$ are tert-butyl.

6. The catalyst system according to claim 1, wherein $R^3$ and $R^{14}$ are independently tert-octyl or n-octyl.

7. The catalyst system according to claim 1, wherein $R^6$ and $R^{11}$ are halogen.

8. The catalyst system according to claim 1, wherein $R^6$ and $R^{11}$ are tert-butyl.

9. The catalyst system according to claim 1, wherein $R^3$ and $R^{14}$ are methyl; and wherein $R^6$ and $R^{11}$ are halogen.

10. The catalyst system according to claim 1, wherein:
 (A) when $R^{5-7}$ are fluorine, not more than one of $R^{10-12}$ is fluorine;
 (B) when $R^{10-12}$ are fluorine, not more than one of $R^{5-7}$ is fluorine; or
 (C) fewer than four of $R^{5-7}$ and $R^{10-12}$ are fluorine.

11. The catalyst system according to claim 1, wherein $R^7$, $R^8$, $R^9$, and $R^{10}$ are —H.

12. The catalyst system according to claim 1, wherein $R^7$ and $R^{10}$ are halogen.

13. The catalyst system according to claim 1, wherein R5 and R12 are halogen.

14. The catalyst system according to claim 1, wherein at least one of $R^{17}$ and $R^{18}$ is $(C_3-C_{50})$hydrocarbyl.

15. The catalyst system according to claim 1, wherein $R^{17}$ and $R^{18}$ are 2-propyl.

16. The catalyst system according to claim 1, wherein at least one of $R^{17}$ and $R^{18}$ is cyclopentyl or cyclohexyl.

17. The catalyst system according to claim 1, wherein at least one of $R^1$ and $R^{16}$ is a radical having formula (III); and both $R^{42}$ and $R^{47}$ are —H.

18. A polymerization process for producing an ethylene-based polymer, the polymerization process comprising:
 polymerizing ethylene and at least one additional α-olefin in the presence of a catalyst system according to claim 1, wherein the ethylene-based polymer exhibits:
 a density from 0.850 g/cm³ to 0.950 g/cm³ according to ASTM D792;
 a melt flow ratio ($I_{10}/I_2$) from 5-15, where melt index $I_2$ is measured according to ASTM D1238 at 190° C. and 2.16 kg load, and melt index $I_{10}$ is measured according to ASTM D1238 at 190° C. and 10 kg load;
 a molecular weight distribution (MWD) from 1 to 5, where MWD is a ratio of weight average molecular weight to number average molecular weight.

19. The polymerization process according to claim 18, wherein the catalyst system further comprises at least one cocatalyst.

20. The polymerization process according to claim 18, wherein the catalyst system comprises a first catalyst and at least one additional catalyst, wherein the first catalyst is a catalytically activated form of the metal-ligand complex according to formula (I).

* * * * *